United States Patent
Suda et al.

(10) Patent No.: US 6,847,710 B1
(45) Date of Patent: Jan. 25, 2005

(54) DEVICE FOR COLLECTING, PROCESSING, WORKING, AND MANAGING CALL DETAILS AND METHOD FOR COLLECTING, PROCESSING, WORKING, AND MANAGING CALL DETAILS

(75) Inventors: Shinichiro Suda, Tokyo (JP); Hayao Toyoma, Yokohama (JP)

(73) Assignee: NTT Comware Corporation (JP)

( * ) Notice: Subject to any disclaimer, the term of this patent is extended or adjusted under 35 U.S.C. 154(b) by 311 days.

(21) Appl. No.: 10/110,799

(22) PCT Filed: Sep. 6, 2000

(86) PCT No.: PCT/JP00/06031
§ 371 (c)(1),
(2), (4) Date: Apr. 12, 2002

(87) PCT Pub. No.: WO01/28218
PCT Pub. Date: Apr. 19, 2001

(30) Foreign Application Priority Data

Oct. 13, 1999 (JP) ............................................ 11-291457

(51) Int. Cl.⁷ ............................................. H04M 15/00

(52) U.S. Cl. ............. 379/126; 379/112.01; 379/114.01; 379/114.03; 379/114.04; 379/114.28; 379/116; 379/133; 455/406

(58) Field of Search ........................ 379/112.01, 112.02, 379/112.05, 112.06, 112.1, 114.01, 114.03, 114.04, 114.05, 114.28, 115.01, 116, 119, 121.05, 126, 133, 134, 135, 140, 220.01, 221.06, 221.08, 221.09; 455/405, 406, 407, 408

(56) References Cited

U.S. PATENT DOCUMENTS

| | | | | |
|---|---|---|---|---|
| 5,574,770 A | * | 11/1996 | Yoo et al. ................. | 379/32.02 |
| 5,907,603 A | * | 5/1999 | Gallagher et al. .......... | 379/133 |
| 5,999,604 A | * | 12/1999 | Walter ......................... | 379/133 |
| 6,385,301 B1 | * | 5/2002 | Nolting et al. ........... | 379/32.01 |
| 6,385,444 B1 | * | 5/2002 | Peschel et al. .............. | 455/405 |
| 6,470,386 B1 | * | 10/2002 | Combar et al. ............. | 709/224 |
| 6,532,282 B1 | * | 3/2003 | Plush et al. ............ | 379/114.03 |

* cited by examiner

Primary Examiner—Quoc Tran
(74) Attorney, Agent, or Firm—Brinks Hofer Gilson & Lione

(57) ABSTRACT

A gathering apparatus gathers CDRs from a CDR accumulating apparatus at the start time of a cycle operation, and transmits them to a processing apparatus. If the gathering of CDRs is not finished within a predetermined period of the cycle operation, a job starting function in a next and all following cycle operations is disengaged. Then, after the gathering in the present cycle operation is finished, the gathering in the next and all following cycles of manipulation is performed.

23 Claims, 17 Drawing Sheets

DEVICE FOR COLLECTING, PROCESSING, WORKING, AND MANAGING CALL DETAILS AND METHOD FOR COLLECTING, PROCESSING, WORKING, AND MANAGING CALL DETAILS

RELATED APPLICATIONS

This application is the National Stage of International Application No. PCT/JP00/06031, filed Sep. 6, 2000, which claims priority to Japanese Application No. 11-291457, filed Oct. 13, 1999.

TECHNICAL FIELD

The present invention relates to a call detail gathering apparatus, a call detail processing apparatus, a call detail manipulating apparatus, a call detail managing apparatus, a call detail manipulating system, a call detail gathering method, a call detail processing method, a call detail manipulating method, and a call detail managing method. More particularly, the present invention relates to a technology for accommodating a delay if such a delay takes place in gathering and processing call detail records.

BACKGROUND ART

In a telecommunication service, call information generated when a user uses the telecommunication service is processed into a CDR (call detail record) by an exchange installed in a network. Settlement of a communication charge that occurs as a result of the use of the telecommunication service is performed on the basis of the CDR information.

The volume of the CDR (or call information) generated is significantly influenced by a local characteristic that depends upon the areas where the CDR is generated, including urban areas, suburban areas, and local city areas; or a temporal characteristic closely related to human activity hours or economic activity hours.

Accordingly, the processing efficiency of a billing system for carrying out settlement processing of communication charges on the basis of CDR information deteriorates if the aforesaid local characteristic or temporal characteristic is not taken into account when carrying out such processing.

Furthermore, in the billing system that carries out settlement processing of communication charges on the basis of the CDR information, if, for example, an exchange system that processes the CDR incurs failure, then the processing of the CDRs involved in the settlement processing is interrupted in the billing system. When the failure is removed thereafter, the CDRs that would have been processed during the period of interruption from the failure are processed all at once and flow into the billing system, thus considerably influencing the settlement processing of communication charges. Hence, the processing efficiency deteriorates unless settlement processing of communication charges is carried out according to the operating condition of the exchange system.

DISCLOSURE OF INVENTION

The present invention provides a call detail gathering apparatus, a call detail processing apparatus, a call detail manipulating apparatus, a call detail managing apparatus, a call detail processing system, a call detail gathering method, a call detail processing method, a call detail manipulating method, and a call detail managing method that permit efficient gathering and processing of call detail records according to local characteristics, temporal characteristics, or the operating conditions of a exchange system.

According to one mode of the present invention, a call detail gathering apparatus that repeats a gathering cycle operation for gathering call detail records that have occurred in a predetermined occurrence period comprises a gathering unit for gathering call detail records from an external unit, a starting unit for starting the collection by the gathering unit at each predetermined start time for the gathering cycle operation, a start canceling unit that cancels starts of a next and all following gathering cycle operations by the starting unit if a gathering cycle operation is not finished within a predetermined period for the gathering cycle operation, and a conditional starting unit that, if a start has been canceled by the start canceling unit, starts a next and all following gathering cycle operations after the gathering cycle operation is finished.

According to another mode of the present invention, a call detail processing apparatus that repeats a processing cycle operation for processing call detail records that have occurred and have been gathered in a predetermined occurrence period comprises a receiving unit for receiving call detail records from an external apparatus, a processing unit for processing the received call detail records, and a process suspending unit that, if a processing cycle operation is not finished within a predetermined processing cycle operation period, suspends a next and all following processing cycle operations until the processing cycle operation is finished.

According to still another mode of the present invention, a call detail manipulating apparatus that repeats a gathering and processing cycle operation for gathering and processing call detail records that have occurred in a predetermined occurrence period comprises a gathering and processing unit for gathering call detail records from an external apparatus and for processing the call detail records, a starting unit for starting the collection by the gathering unit at each predetermined start time for the gathering and processing cycle operation, a start canceling unit that cancels starts of a next and all following gathering and processing cycle operations by the starting unit if a gathering and processing cycle operation is not finished within a predetermined period for the gathering and processing cycle operation, and a conditional starting unit that, if a start has been canceled by the start canceling unit, starts a next and all following gathering and processing cycle operations after the gathering and processing cycle operation is finished.

According to yet another mode of the present invention, a call detail gathering apparatus that repeats a gathering cycle operation for gathering, in a predetermined gathering period that corresponds to the occurrence period, call detail records, that has occurred in a predetermined occurrence period, comprises a gathering unit for gathering call detail records from an external apparatus, wherein the gathering unit gathers, if some call detail records, that have occurred in preceding gathering cycle operations, are still ungathered, the ungathered call detail record as well as call detail records that have occurred in the occurrence period.

The gathering unit may alternatively comprise a gathering limiter for limiting call detail records to be gathered in one gathering cycle operation, and the gathering unit may gather ungathered call detail records, which have been excluded by the gathering limiter, as well as call detail records to be gathered in a next and all following gathering cycle operations.

The gathering limiter may gather the excluded call detail records by limiting them within a range for one gathering cycle operation even in a next and all following gathering cycle operations.

The call detail gathering apparatus may alternatively comprise a starting unit for starting the collection by the gathering unit at each predetermined start time for the gathering cycle operation, a start canceling unit that cancels starts of a next and all following gathering cycle operations by the starting unit if a gathering cycle operation is not finished within a predetermined gathering cycle operation period; and a conditional starting unit that, if a start has been canceled by the start canceling unit, starts a next and all following gathering cycle operations after the gathering cycle operation is finished.

The gathering unit may alternatively comprise a processing unit for processing the gathered call detail records.

According to a further mode of the present invention, a call detail gathering apparatus that repeats a gathering cycle operation for gathering call detail records that have occurred in a predetermined occurrence period comprises a gathering unit for gathering call detail records from an external apparatus, a dividing unit for dividing call detail records that have occurred in an out-of-service period, during which the call detail record gathering apparatus was out of service, into a predetermined number of call detail records, and a distributing unit for distributing call detail records that have been divided by the dividing unit to following gathering cycle operation after the call detail record gathering apparatus resumes its operation, wherein the gathering unit gathers the call detail records distributed by the distributing unit as well as call detail records that have occurred in the occurrence period.

The predetermined number of call detail records may be set within a range in which a gathering cycle operation is finished within a predetermined gathering cycle operation period in the gathering cycle operation.

The call detail gathering apparatus may alternatively comprise a starting unit for starting collection by the gathering unit at each predetermined start time for the gathering operation cycle, a start canceling unit that cancels starts of a next and all following gathering cycle operations by the starting unit if a gathering cycle operation is not finished within a predetermined gathering cycle operation period, and a conditional starting unit that starts a next and all following gathering cycle operations after the gathering cycle operation is finished if a start has been canceled by the start canceling unit.

The gathering unit may alternatively comprise a processing unit for processing gathered call detail records.

According to a further mode of the present invention, a call detail managing apparatus that manages a call detail gathering system, wherein the call detail gathering system comprises a plurality of gathering apparatuses for gathering call detail records from a plurality of external apparatuses for accumulating call detail records, comprises an average gathered amount computing unit for calculating an average gathered amount over a plurality of gathering apparatuses on the basis of gathered amounts of the gathering apparatuses, and an assignment setting unit for setting the assignment of the external apparatuses to the gathering apparatuses on the basis of the average gathered amount.

According to another mode of the present invention, a call detail manipulating system comprises a call detail processing apparatus that repeats a processing cycle operation for processing call detail records that have occurred and have been gathered in a predetermined occurrence period, and comprises a receiving unit for receiving call detail records from a call detail gathering apparatus, a processing unit for processing the received call detail records, and a process suspending unit that, if a processing cycle is not finished within a predetermined processing cycle operation period, suspends a next and all following processing cycle operations until the processing cycle operation is finished; and a call detail gathering apparatus that repeats a gathering cycle operation for gathering call detail records that have occurred in a predetermined occurrence period and comprises a gathering unit for gathering call detail records from an external apparatus, a starting unit for starting the collection by the gathering unit at each predetermined start time for the gathering cycle operation, a start canceling unit that cancels starts of a next and all following gathering cycle operations by the starting unit if a gathering cycle operation is not finished within a predetermined gathering cycle operation period, a conditional starting unit that starts a next and all following gathering cycle operations after the gathering cycle operation is finished if a start has been canceled by the start canceling unit, and a transmitting unit for transmitting the gathered call detail records to the call detail processing apparatus.

According to a further mode of the present invention, a call detail manipulating system comprises a call detail processing apparatus that repeats a processing cycle operation for processing call detail records that have occurred and have been gathered in a predetermined occurrence period, and comprises a receiving unit for receiving call detail records from a call detail gathering apparatus, a processing unit for processing the received call detail records, and a process suspending unit that, if a processing cycle is not finished within a predetermined processing cycle period, suspends a next and all following processing cycle operations until the processing cycle operation is finished; and a call detail gathering apparatus that repeats a gathering cycle operation for gathering, in a predetermined gathering period that corresponds to the occurrence period, call detail records, that have occurred in a predetermined occurrence period, and comprises a gathering unit for gathering call detail records from an external apparatus, a starting unit for starting the collection by the gathering unit at each predetermined start time for the gathering cycle operation, a start canceling unit that cancels starts of a next and all following gathering cycle operations by the starting unit if a gathering cycle operation is not finished within a predetermined gathering cycle operation period, and a conditional starting unit that starts a next and all following gathering cycle operations after the gathering cycle operation is finished if a start has been canceled by the start canceling unit, and a transmitting unit for transmitting the gathered call detail records to the call detail processing apparatus, wherein the gathering unit gathers, if some call detail records, that have occurred in preceding gathering cycle operations, are still ungathered, the ungathered call detail record as well as call detail records that has occurred in the occurrence period.

According to another mode of the present invention, a call detail manipulating system comprises a call detail processing apparatus that repeats a processing cycle operation for processing call detail records that have occurred and have been gathered in a predetermined occurrence period, and comprises a receiving unit for receiving call detail records from a call detail gathering apparatus, a processing unit for processing the received call detail records, and a process suspending unit that, if a processing cycle operation is not finished within a predetermined processing cycle operation period, suspends a next and all following processing cycle operations until the processing cycle operation is finished; and a call detail gathering apparatus that repeats a gathering cycle operation for gathering call detail records that have occurred in a predetermined occurrence period and comprises a gathering unit for gathering call detail records from an external apparatus, a dividing unit for dividing call detail records that have occurred in a suspension period, during which the call detail record gathering apparatus was out of service, into a predetermined number of call detail records, a distributing unit for distributing the call detail records that have been divided by the dividing unit to a gathering cycle operation after the call detail record gathering apparatus resumes its operation, a starting unit for starting the collection by the gathering unit at each predetermined start time for the gathering cycle operation, a start canceling unit that cancels starts of a next and all following gathering cycle operations by the starting unit if a gathering cycle operation is not finished within a predetermined gathering cycle operation period, a conditional starting unit that starts a next and all following gathering cycle operations after the gathering cycle operation is finished if a start has been canceled by the start canceling unit, and a transmitting unit for transmitting the gathered call detail records to the call detail processing apparatus, wherein the gathering unit gathers the call detail records, that have been distributed by the distributing unit, as well as call detail records that have occurred in the occurrence period.

According to still another mode of the present invention, a call detail gathering method repeats a gathering cycle operation for gathering call detail records that have occurred in a predetermined occurrence period, and comprises a gathering step for gathering call detail records from an external apparatus, a starting step for starting the collection in the gathering step at each predetermined start time of the gathering cycle operation, a start canceling step that cancels starts of a next and all following gathering cycle operations by the starting step if a gathering cycle operation does not terminate within a predetermined period for the gathering cycle operation, and a conditional starting step that starts a next and all following gathering cycle operations after the gathering cycle operation terminates if a start has been canceled in the start canceling step.

According to another mode of the present invention, a call detail processing method that repeats a processing cycle operation for processing gathered call detail records that have occurred and have been gathered in a predetermined occurrence period comprises a receiving step for receiving call detail records from an external apparatus, a processing step for processing the received call detail records, and a process suspending step that, if a processing cycle operation is not finished within a predetermined processing cycle operation period, suspends a next and all following processing cycle operations until the processing cycle operation is finished.

According to still another mode of the present invention, a call detail manipulating method that repeats a gathering and processing cycle operation for gathering and processing call detail records that have occurred in a predetermined occurrence period comprises a gathering and processing step for gathering call detail records from an external apparatus and for processing the call detail records, a starting step for starting the collection in the gathering step at each predetermined start time for the gathering and processing cycle operation, a start canceling step for canceling starts of a next and all following gathering and processing cycle operations in the starting step if a gathering and processing cycle operation is not finished within a predetermined gathering and processing cycle period, and a conditional starting step that starts a next and all following gathering and processing cycle operations after the gathering and processing cycle operation is finished if a start has been canceled in the start canceling step.

According to yet another mode of the present invention, a call detail gathering method that repeats a gathering cycle operation for gathering, in a predetermined gathering period that corresponds to the occurrence period, call detail records, that has occurred in a predetermined occurrence period comprises a gathering step for gathering call detail records from an external apparatus, wherein the gathering step gathers, if some call detail records that have occurred in preceding gathering cycle operations are still ungathered, the ungathered call detail records as well as call detail records that have occurred in the occurrence period.

The gathering step may alternatively include a gathering limiting step for limiting call detail records to be gathered in one gathering cycle operation, and the gathering limiting step may gather ungathered call detail records, which have been excluded in the gathering limiting step, as well as call detail records to be gathered in a next and all following gathering cycle operations.

According to a further mode of the present invention, a call detail gathering method that repeats a gathering cycle operation for gathering call detail records that have occurred in a predetermined occurrence period comprises a gathering step for gathering call detail records from an external apparatus, a dividing step for dividing call detail records that have occurred in a suspension period, during which the call detail record gathering apparatus was out of service, into a predetermined number of call detail records, and a distributing step for distributing the call detail records, that have been divided in the dividing step, to following gathering cycle operations after the call detail record gathering apparatus resumes its operation, wherein the gathering step gathers the call detail records distributed by the distributing step as well as call detail records that have occurred in the occurrence period.

According to a further mode of the present invention, a call detail management method for managing a call detail gathering system, wherein the call detail gathering system has a plurality of gathering apparatuses for gathering call detail records from a plurality of external apparatuses for accumulating call detail records, comprises an average gathered amount computing step for calculating an average gathered amount over a plurality of gathering apparatuses on the basis of the gathering amounts of the gathering apparatuses, and an assignment setting step for setting the assignment of the external apparatuses to the gathering apparatuses on the basis of the average gathered amount.

BEST MODE FOR CARRYING OUT THE INVENTION

[1] First Embodiment

[1.1] Configuration of the First Embodiment

[1.1.1] Schematic Configuration of a Call Detail Record Manipulating System

Figure 1:
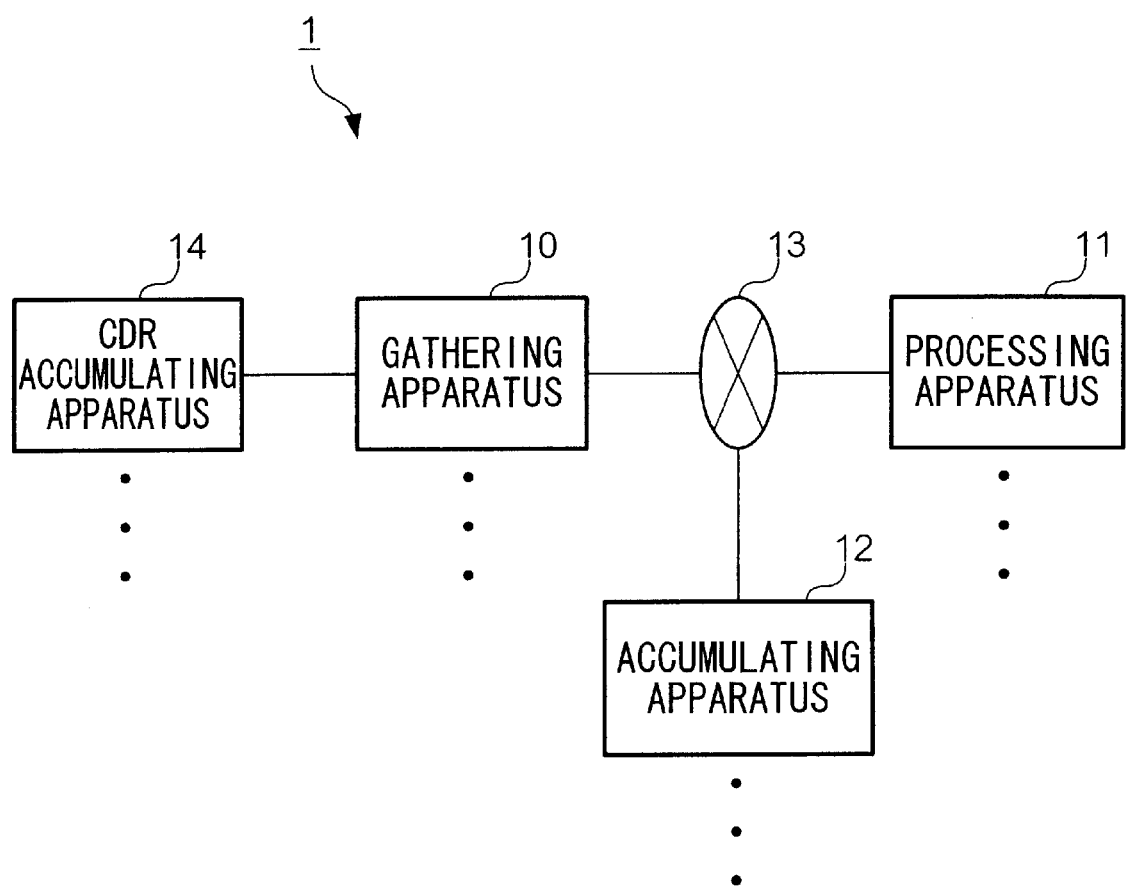
FIG. 1 is a diagram showing a schematic construction of a call detail record manipulating system in accordance with a first embodiment of the present invention.

FIG. 1 shows a schematic configuration of a call detail record manipulating system 1 in accordance with a first embodiment of the present invention.

As shown in FIG. 1, the call detail record manipulating system 1 is provided with a gathering apparatus 10 that gathers CDRs (Call Detail Records), which are the records of call details, from a CDR accumulating apparatus 14, which is an external apparatus, a processing apparatus 11 that processes the CDRs gathered by the gathering apparatus 10, and an accumulating apparatus 12 that accumulates the CDRs processed by the processing apparatus 11.

The gathering apparatus 10, the processing apparatus 11, and the accumulating apparatus 12 are connected with each other through the intermediary of a high-speed LAN (Local Area Network), e.g., FDDI (Fiber Distributed Data Interface).

[1.1.2] Functional Configuration of the Call Detail Record Manipulating System

[1.1.2.1] Functional Configuration of the Gathering Apparatus

Figure 2:
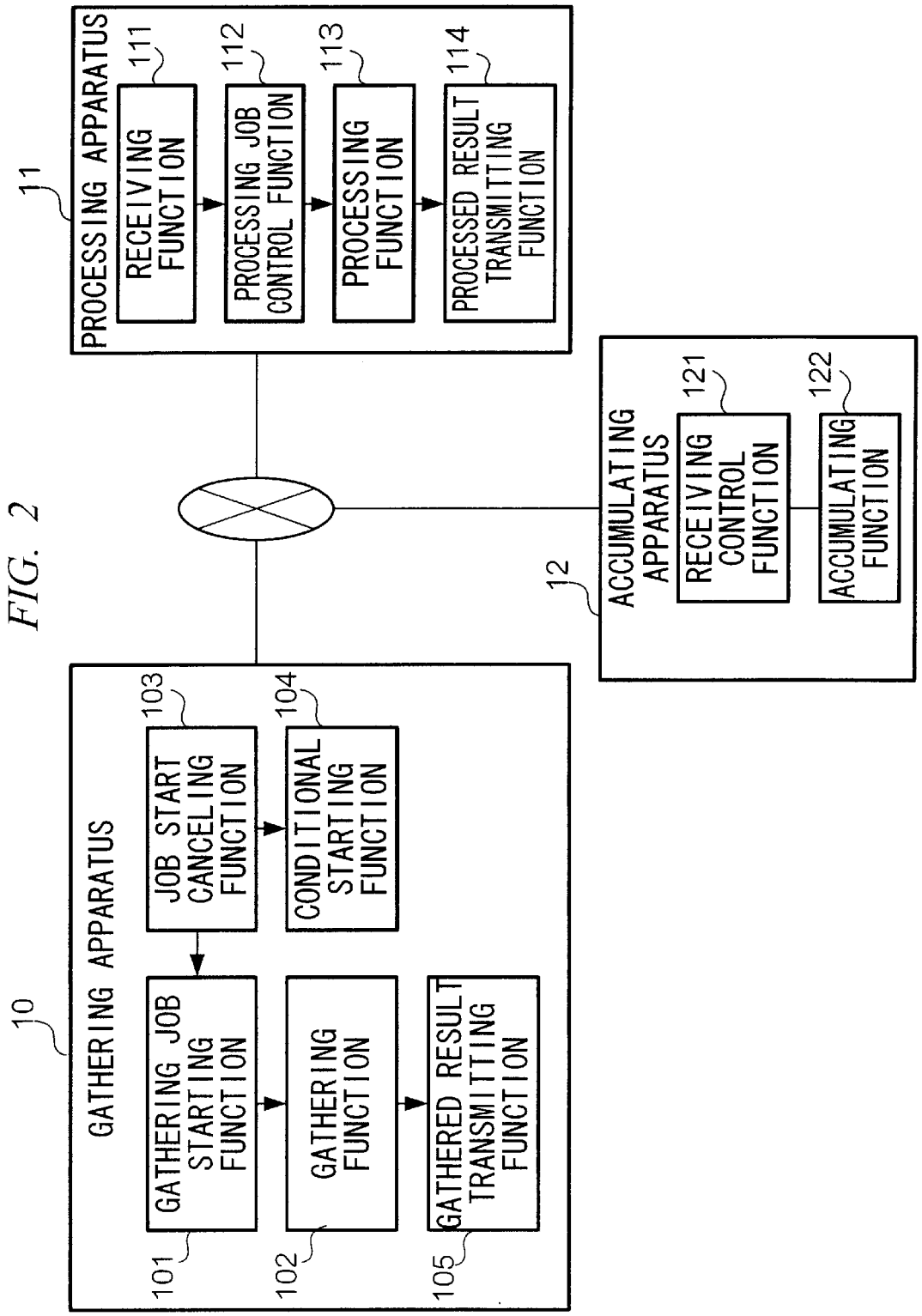
FIG. 2 is a block diagram showing a functional configuration of the call detail record manipulating system in the first embodiment.

Referring to FIG. 2, a functional configuration of the gathering apparatus 10 will be described.

As shown in FIG. 2, the gathering apparatus 10 has a gathering job starting function 101 for starting a gathering job at each predetermined start time of a cycle operation for repeating the gathering and processing of CDRs that have occurred in a predetermined period, and a gathering function 102 for gathering CDRs accumulated in the CDR accumulating apparatus 14, which is an external apparatus. The gathering apparatus 10 also includes a job start canceling function 103 that, if the collection of the CDRs is not finished within a predetermined period, releases the gathering job starting function 101 in the next cycle operation and after so as to prevent the gathering job from being automatically started at the start time of the next cycle operation and after. The gathering apparatus 10 further includes a conditional starting function 104 that, if the start of the next and all following cycle operations has been canceled by the job start canceling function 103, starts the gathering of CDRs in the next and all following cycle operations after the gathering of the CDRs currently being implemented is finished, and a gathered result transmitting function 105 for transmitting the gathered CDRs to the processing apparatus 11.

[1.1.2.2] Functional Configuration of the Processing Apparatus

Referring to FIG. 2, the functional configuration of the processing apparatus 11 will be explained.

As shown in FIG. 2, the processing apparatus 11 has a receiving function 111 for receiving CDRs from the gathering apparatus 10, and a processing job control function 112 for controlling the processing job for processing the received CDRs. The processing apparatus 11 also has a processing function 113 for processing CDRs according to the processing job controlled by the processing job control function 112, and a processed result transmitting function 114 for transmitting the processed CDRs to the accumulating apparatus 12.

The processing includes, for example, the preparation of settlement information for settling charges for each carrier on the basis of the call information stored in the CDR.

The processing job control function 112 has a function for determining, before starting the processing of CDRs, whether the processing of CDRs to be implemented in the previous cycle operation or earlier is being continued. And, if the processing job control function 112 determines that the processing of CDRs to be implemented in the previous cycle operation or earlier is being carried out, then it suspends the processing of CDRs to be carried out in the present cycle operation until the processing that is currently being continued is finished.

[1.1.2.3] Functional Configuration of the Accumulating Apparatus

Referring to FIG. 2, the functional configuration of the accumulating apparatus 12 will be explained.

As shown in FIG. 2, the accumulating apparatus 12 has a receiving control function 121 for receiving CDRs from the processing apparatus 11, and an accumulating function 122 for accumulating CDRs received by the receiving control function 121.

[1.1.3] Hardware Configuration of the Gathering Apparatus

Figure 3:
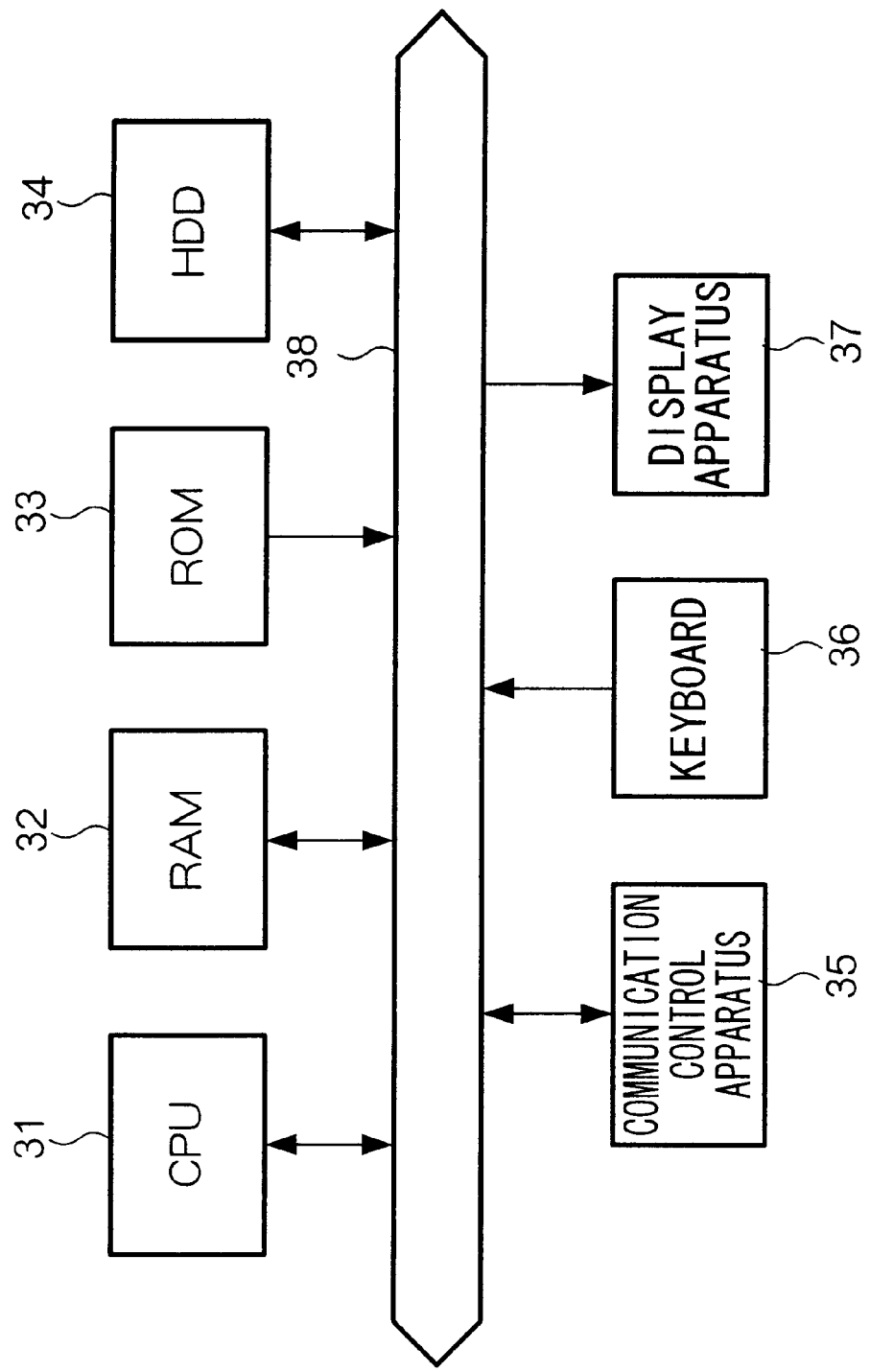
FIG. 3 is a diagram showing a hardware configuration of a gathering apparatus shown in FIG. 1.

Referring to FIG. 3, the hardware configuration of the gathering apparatus 10 will be explained.

As shown in FIG. 3, the gathering apparatus 10 is provided with a central processing unit (CPU) 31 that integrally carries out arithmetic processing and control processing, a read-only memory (ROM) 33 in which programs of various types of control have been stored, and a main memory (RAM) 32 for temporarily storing a program being run and data, etc. The gathering apparatus 10 is further provided with an auxiliary memory (HDD) 34 that stores programs for controlling the job starting function 101, the gathering function 102, the job start canceling function 103, the conditional starting function 104, and the gathered result transmitting function 105, which have been described above. Furthermore, the gathering apparatus 10 is also provided with a communication control unit 35 serving as a connecting interface for the connection with the CDR accumulating apparatus 14, which is an external apparatus, the processing apparatus 11, and the accumulating apparatus 12 through the intermediary of a communication line, a keyboard 36 for entering diverse types of data, and a display unit 37 for displaying processing results, etc. The CPU 31, the RAM 32, the ROM 33, the HDD 34, the communication control unit 35, the keyboard 36, and the display unit 37 are interconnected through a bus (BUS) 38.

The processing apparatus 11 and the accumulating apparatus 12 share a hardware configuration similar to that of the gathering apparatus 10.

[1.2] Operation of the First Embodiment

[1.2.1] Schematic Operation of the Gathering Apparatus

Referring to FIG. 2 and FIG. 3, the schematic operation of the gathering apparatus 10 will be explained.

In the gathering apparatus 10, when a predetermined start time of the cycle operation for gathering and processing CDRs is reached, the CPU 31 causes a program for controlling the job starting function 101 to be read from the HDD 34 and stored in the RAM 32. Then, the CPU 31 starts the program for controlling the job starting function 101.

Next, the CPU 31 causes a program for controlling the gathering function 102 and data necessary for executing the program to be read from the HDD 34 and stored in the RAM 32. Then, the CPU 31 gathers CDRs from the CDR accumulating apparatus 14 connected through the intermediary of the communication control unit 35 according to the program for controlling the gathering function 102.

Next, the CPU 31 causes a program for controlling the gathered result transmitting function 105 to be read from the HDD 34 and stored in the RAM 32. Then, the CPU 31 gathers CDRs from the CDR accumulating apparatus 14 to the processing apparatus 11 connected through the intermediary of the communication control unit 35 according to the program for controlling the gathered result transmitting function 105.

Furthermore, the CPU 31 causes a program for controlling the job start canceling function 103, which releases the job starting function 101 in next and all following cycle operations if the gathering of CDRs is not finished within a predetermined period, to be read from the HDD 34 and stored in the RAM 32. Then, the CPU 31 executes the program for controlling the job start canceling function 103.

Next, the CPU 31 causes a program for controlling the conditional starting function 104 to be read from the HDD 34 and stored in the RAM 32. Then, after the gathering to be performed in the present cycle operation is finished, the CPU 31 executes a program for controlling the gathering (the gathering function 102) to be carried out in next and all following cycle operations.

[1.2.2] Operation Performed when Delay Occurs

Figure 4:
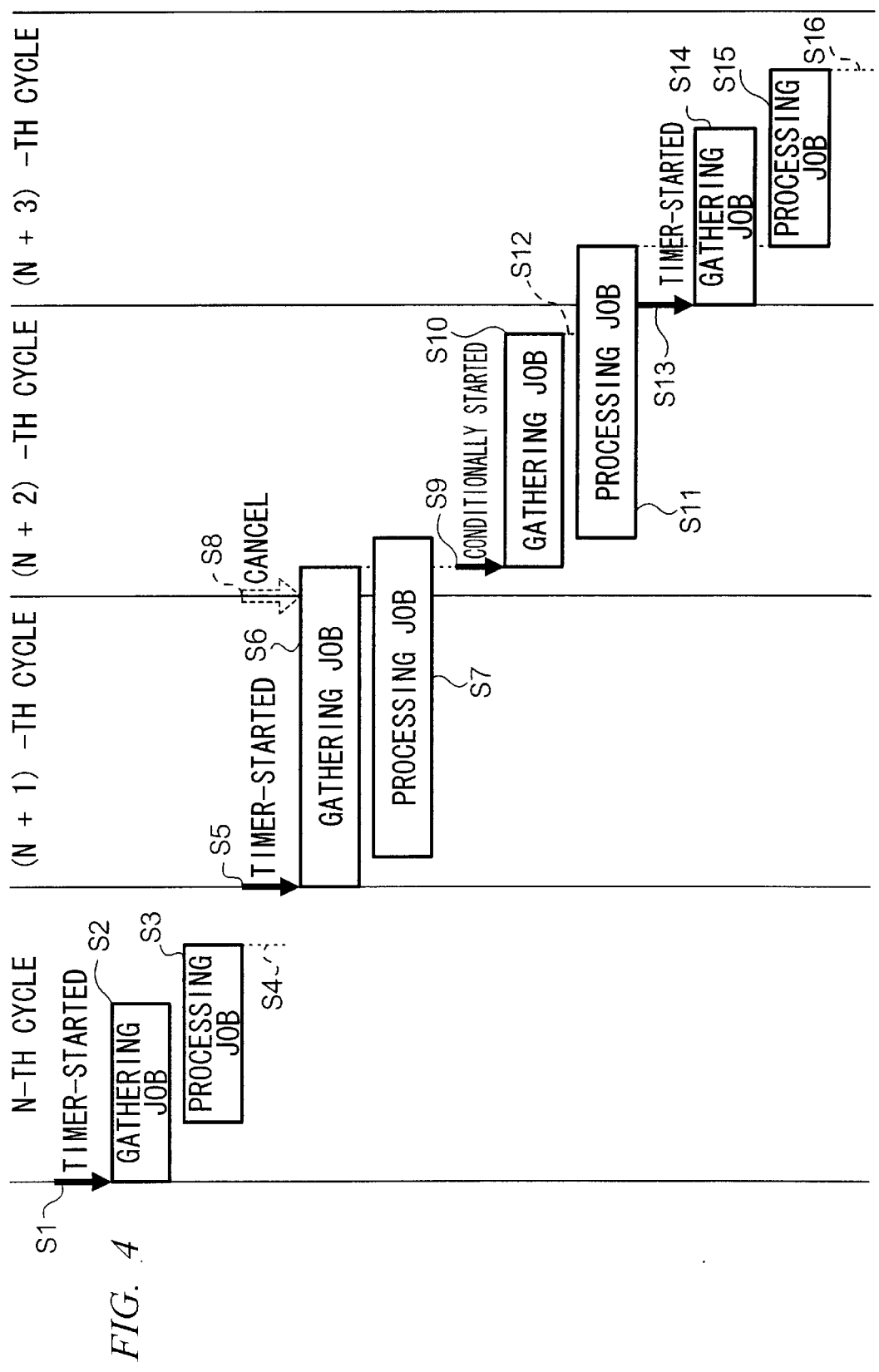
FIG. 4 is a diagram illustrating an operation example of the call detail record manipulating system in the first embodiment.

With reference to FIG. 4, an example of operation performed if a delay takes place in gathering and processing CDRs in the call-detail record manipulating system 1 will be described.

In this example of operation, the gathering job and the processing job in an "Nth cycle" and an "Nth+3 cycle" illustrate a case where it has been possible to finish the jobs within a time allocated to the cycle operation. Furthermore, the gathering job and the processing job in an "Nth+1 cycle" illustrate a case where it has not been possible to finish the jobs within a time allocated to the cycle operation. Furthermore, the gathering job in an "Nth+2 cycle" illustrates a case where it has been possible to finish the job within a time allocated to the cycle operation. The processing job in the "Nth+2 cycle" illustrates a case where it has not been possible to finish the job within a time allocated to the cycle operation.

First, at the gathering start time of the "Nth cycle", which is one cycle of lo the cycle operation for gathering and processing CDRs, the gathering job for gathering CDRs from the CDR accumulating apparatus 14 is timer-started by the gathering job starting function 101 of the gathering apparatus 10 (step S1).

In the gathering apparatus 10, CDRs are gathered from the CDR accumulating apparatus 14 by the gathering function 102 according to the started gathering job. Then, the gathered CDRs are transmitted by the gathered result transmitting function 105 from the gathering apparatus 10 to the processing apparatus 11 (step S2).

The CDRs received by the receiving function 111 of the processing apparatus 11 are processed by the processing function 113 that functions according to the processing job controlled by the processing job control function 112 (step S3).

In this operation example, the gathering job and the processing job for CDRs in the "Nth cycle" are finished within the time allotted to the "Nth cycle" (step S4).

Next, at the gathering start time of the "Nth+1 cycle", the gathering job for gathering CDRs from the CDR accumulating apparatus 14 is timer-started by the gathering job starting function 101 of the gathering apparatus 10 (step S5).

In the gathering apparatus 10, CDRs are gathered from the CDR accumulating apparatus 14 by the gathering function 102 that functions according to the started gathering job. Then, the gathered CDRs are transmitted by the gathered result transmitting function 105 from the gathering apparatus 10 to the processing apparatus 11 (step S6).

The CDRs received by the receiving function 111 of the processing apparatus 11 are processed by the processing function 113 that functions according to the processing job controlled by the processing job control function 112 (step S7).

In this operation example, the gathering job for CDRs in the "Nth+1 cycle" cannot be finished within the time allotted to the "Nth+1 cycle". Therefore, the job start canceling function 103 of the gathering apparatus 10 cancels the gathering job that would be timer-started at the gathering start time of the "Nth+2 cycle" (step S8).

Then, when the CDR gathering job in the "Nth+1 cycle" is finished, the gathering job to be carried out in the "Nth+2 cycle" is conditionally started by the conditional starting function 104 of the gathering apparatus 10 (step S9).

In the gathering apparatus 10, CDRs are gathered from the CDR accumulating apparatus 14 by the gathering function 102. Then, the gathered CDRs are transmitted by the gathered result transmitting function 105 from the gathering apparatus 10 to the processing apparatus 11 (step S10).

The CDRs received by the receiving function 111 of the processing apparatus 11 are processed by the processing function 113 that functions according to the processing job controlled by the processing job control function 112 (step S11). The processing job that has been carried out in the "Nth+2 cycle" was carried out after the completion of the processing job carried out in the "Nth+1 cycle", so that the function for holding the processing to be implemented in the "Nth+2 cycle" is not working.

In this operation example, the CDR gathering job in the "Nth+2 cycle" has been finished within the time allotted to the "Nth+2 cycle" (step S12).

Next, at the gathering start time of an "Nth+3 cycle", the gathering job is timer-started by the gathering job starting function 101 of the gathering apparatus 10 (step S13).

In the gathering apparatus 10, CDRs are gathered from the CDR accumulating apparatus 14 by the gathering function 102. Then, the gathered CDRs are transmitted by the gathered result transmitting function 105 from the gathering apparatus 10 to the processing apparatus 11 (step S14).

The processing job control function 112 of the processing apparatus 11 holds the processing to be implemented in the "Nth+2 cycle" until the processing job in the "Nth+2 cycle" being implemented in step S11 is finished. Then, upon the completion of the processing job in the "Nth+2 cycle", the processing to be carried out in the "Nth+3 cycle" is started according to the control of the processing job control function 112. (Step S15).

In this operation example, the CDR gathering and processing in the "Nth+3 cycle" has been finished within the time allotted to the "Nth+3 cycle" (step S16).

[1.3] Advantages of the First Embodiment

Thus, even if the gathering and processing of CDRs cannot be finished within the time allotted to one cycle of processing, the gathering job to be started at the gathering start time of next and all following cycle operations is canceled by the job start canceling function 103, and the CDR gathering job to be carried out in next and all following cycle operations is started by the conditional starting function 104. Hence, even if a delay occurs in particular cycle operation, the influence resulting from the delay can be accommodated.

[1.4] Modification of the First Embodiment

The first embodiment described above is equipped with one each of the CDR accumulating apparatus 14, the gathering apparatus 10, the processing apparatus 11, and the accumulating apparatus 12. Alternatively, however, a plurality of each type of the apparatuses may be provided. In such a case, one or a plurality of the CDR accumulating apparatuses 14 may be assigned to each gathering apparatus 10.

[2] Second Embodiment

[2.1] Configuration of the Second Embodiment

[2.1.1] Schematic Configuration of a Call Detail Record Manipulating System

Figure 5:
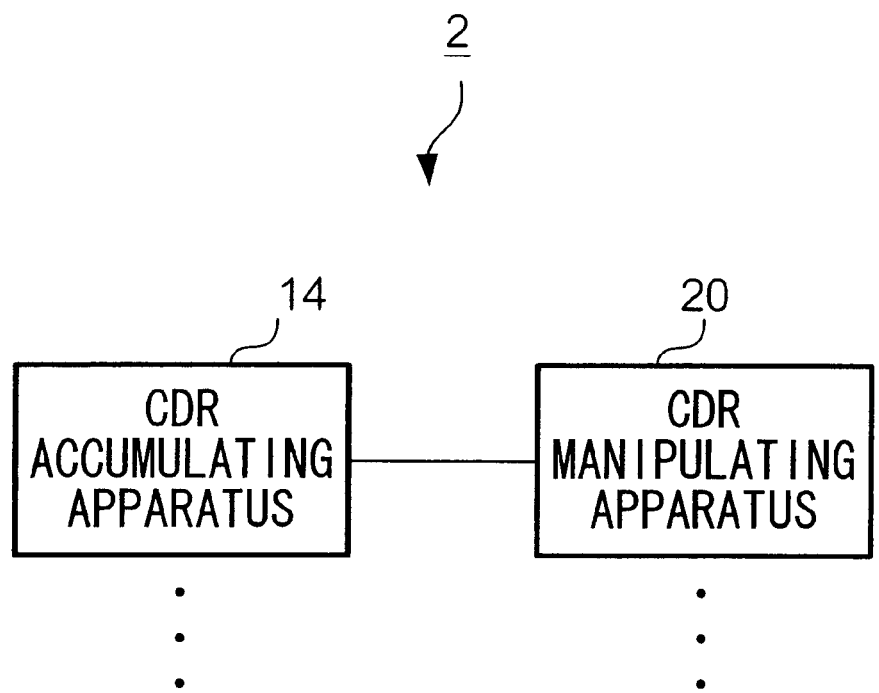
FIG. 5 is a diagram showing a schematic construction of a call detail record manipulating system in accordance with a second embodiment of the present invention.

FIG. 5 shows a schematic configuration of a call detail record manipulating system 2 in accordance with a second embodiment of the present invention.

The schematic configuration of the second embodiment differs from the schematic configuration of the first embodiment in that the second embodiment is equipped with a CDR manipulating apparatus 20 that integrally performs the gathering, processing, and accumulating of CDRs, while the first embodiment is constituted by the gathering apparatus, the processing apparatus, and the accumulating apparatus.

The second embodiment also differs from the first embodiment in that it implements the gathering and processing, which are separately implemented in the first embodiment, in a single gathering and processing operation.

[2.1.2] Functional Configuration of the CDR Manipulating Apparatus

Figure 6:
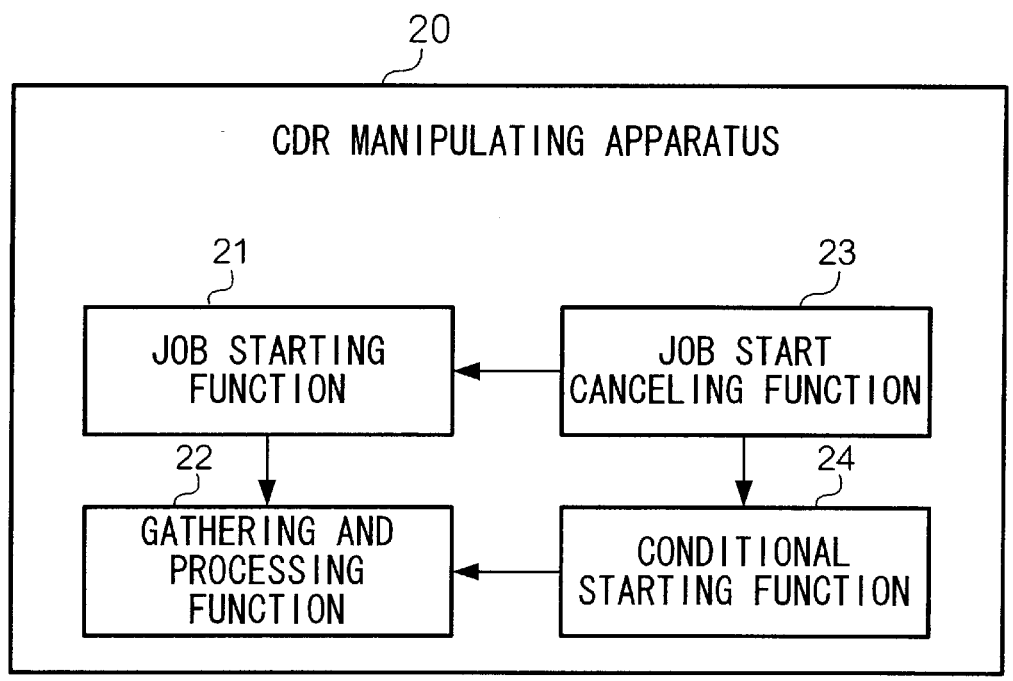
FIG. 6 is a block diagram showing a functional configuration of a CDR manipulating apparatus shown in FIG. 5.

Referring to FIG. 6, the functional configuration of the CDR manipulating apparatus 20 will be described.

As shown in FIG. 6, the CDR manipulating apparatus 20 is equipped with a job starting function 21 that starts a gathering and processing job at each predetermined start time of cycle operation for gathering and processing CDRs that have occurred within a predetermined period, and a gathering and processing function 22 that gathers and processes CDRs accumulated in a CDR accumulating apparatus 14, which is an external apparatus. Furthermore, the CDR manipulating apparatus 20 is equipped with a job start canceling function 23 that, if the gathering and processing of CDRs is not finished within a predetermined period, releases the job starting function 21 in next and all following cycle operations so as to prevent the gathering and processing job from being automatically started at the start time of next and all following cycle operations. The CDR manipulating apparatus 20 is further equipped with a conditional starting function 24 that starts, if the start of next and all following cycle operations has been canceled by the job start canceling function 23, the CDR gathering and processing in next and all following cycle operations after the CDR gathering and processing currently being implemented is finished.

[2.2] Operation of the Second Embodiment

Figure 7:
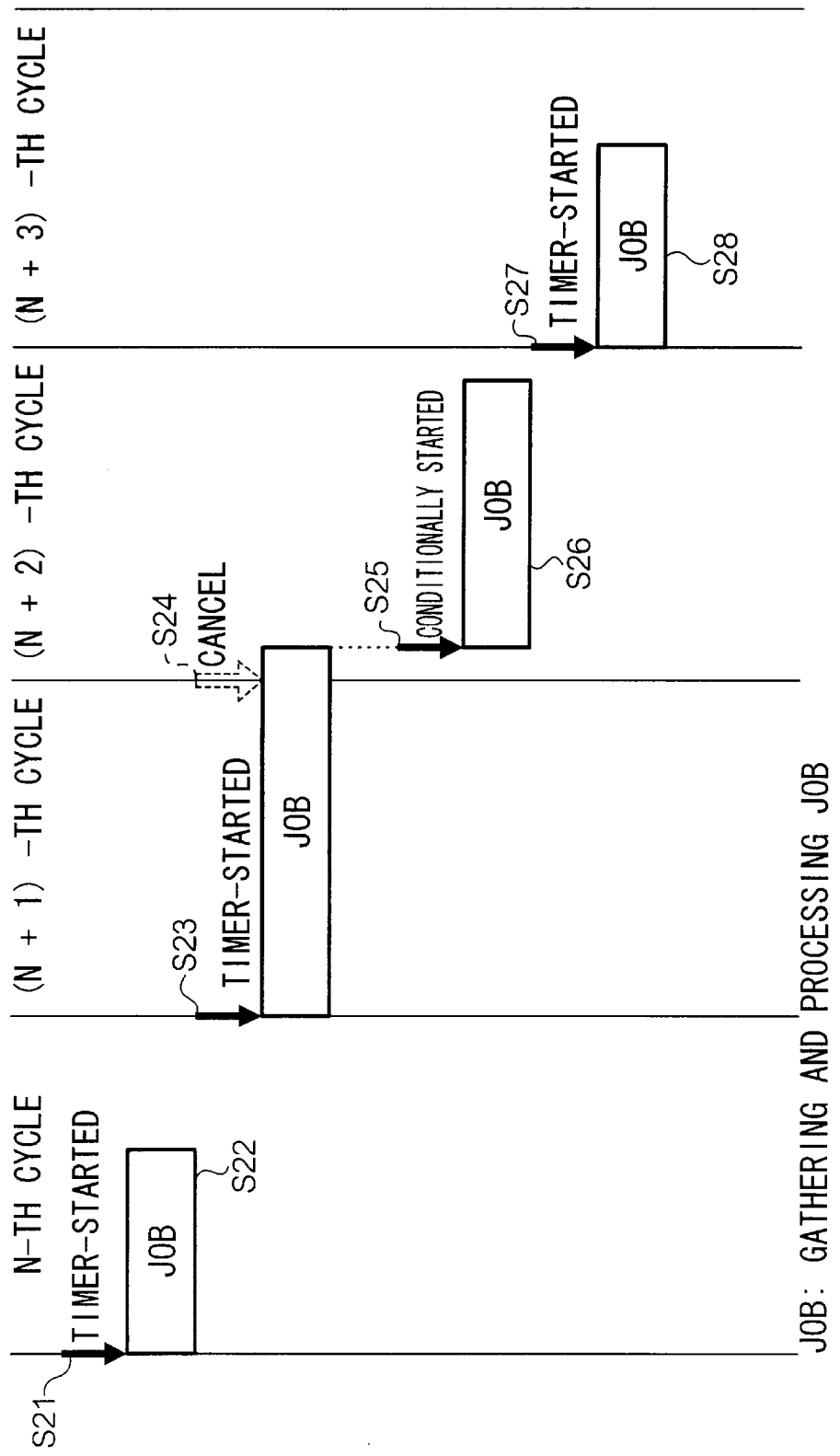
FIG. 7 is a diagram illustrating an operation example of the call detail record manipulating system in the second embodiment.

Referring to FIG. 7, an example of the operation performed if a delay occurs in the gathering and processing of CDRs in the call detail record manipulating system 2 will be described.

In the example of the operation, the gathering and processing job in an "Nth cycle", an "Nth+2 cycle", and an "Nth+3 cycle" illustrate cases where it has been possible to finish the job within the time allotted to one cycle of processing. The gathering and processing job in an "Nth+1 cycle" illustrates a case where it has not been possible to finish the job within the time allotted to the cycle operation.

First, at the manipulating start time of the "Nth cycle", which is one cycle of the cycle operation for gathering and processing CDRs, the gathering and processing job for gathering and processing CDRs from the CDR accumulating apparatus 14 is timer-started by the job starting function 21 of the CDR manipulating apparatus 20 (step S21).

In the CDR manipulating apparatus 20, the gathering and processing function 22 that functions according to the started job causes CDRs to be gathered from the CDR accumulating apparatus 14 and the gathered CDRs to be processed (step S22).

In this operation example, the CDRs gathering and processing job in the "Nth cycle" is finished within the time allotted to the "Nth cycle".

Next, at the manipulating start time of the "Nth+1 cycle", the gathering and processing job for implementing the gathering and processing of CDRs is timer-started by the job starting function 21 of the CDR manipulating apparatus 20 (step S23).

Then, the gathering and processing function 22 that functions according to the started gathering and processing job causes CDRs to be gathered from the CDR accumulating apparatus 14 and the gathered CDRs to be processed.

In this operation example, the CDR gathering and processing job in the "Nth+1 cycle" cannot be finished within the time allotted to the "Nth+1 cycle". Therefore, the job start canceling function 23 of the CDR manipulating apparatus 20 cancels the gathering job that would be timer-started at the manipulating start time of the "Nth+2 cycle" (step S24).

When the CDR gathering and processing job in the "Nth+1 cycle" is finished, the gathering and processing job for implementing the gathering and processing of CDRs that is to be carried out in the "Nth+2 cycle" is conditionally started by the conditional starting function 24 of the CDR manipulating apparatus 20 (step S25).

In the CDR manipulating apparatus 20, the gathering and processing function 22 causes CDRs to be gathered from the CDR accumulating apparatus 14 and the gathered CDRs to be processed (step S26).

In this operation example, the CDR gathering and processing job in the "Nth+2 cycle" has finished within the time allotted to the "Nth+2 cycle".

Next, at the manipulating start time of an "Nth+3 cycle", the gathering and processing job for implementing the gathering and processing CDRs is timer-started by the job starting function 21 of the CDR manipulating apparatus 20 (step S27).

In the CDR manipulating apparatus 20, the gathering and processing function 22 causes CDRs to be gathered from the CDR accumulating apparatus 14 and the gathered CDRs to be processed (step S28).

In this operation example, the CDR gathering and processing job in the "Nth+3 cycle" has been finished within the time allotted to the "Nth+3 cycle".

[2.3] Advantages of the Second Embodiment

Thus, even if the gathering and processing of CDRs cannot be finished within the time allotted to the cycle operation, the gathering and processing job to be started at the manipulating start time of next and all following cycle manipulating is canceled by the job start canceling function 23, and the CDR gathering and processing job to be carried out in next and all following cycle manipulating is started by the conditional starting function 24. Hence, even if a delay occurs in particular cycle manipulating, the influence resulting from the delay can be accommodated.

[3] Third Embodiment

[3.1] Configuration of the Third Embodiment

[3.1.1] Schematic Configuration of a Call Detail Record Manipulating System

The schematic configuration of the third embodiment is the same as the schematic configuration of the first embodiment.

The third embodiment differs from the first embodiment in that the third embodiment is able to gather or process CDRs that have been generated and accumulated during a time other than the time corresponding to one cycle operation, while the first embodiment gathers and processes only CDRs that have been generated and accumulated during the time corresponding to one cycle operation.

Hence, if, for example, a exchange system that generates CDRs and accumulates the generated CDRs in a CDR accumulating apparatus 14 should fail and can no longer accumulate CDRs, then it is advantageous when the CDRs built up during the failure are accumulated at the CDR accumulating apparatus 14 at the same time after the exchange system recovers from the failure.

[3.1.2] Functional Configuration of a Gathering Apparatus

Figure 8:
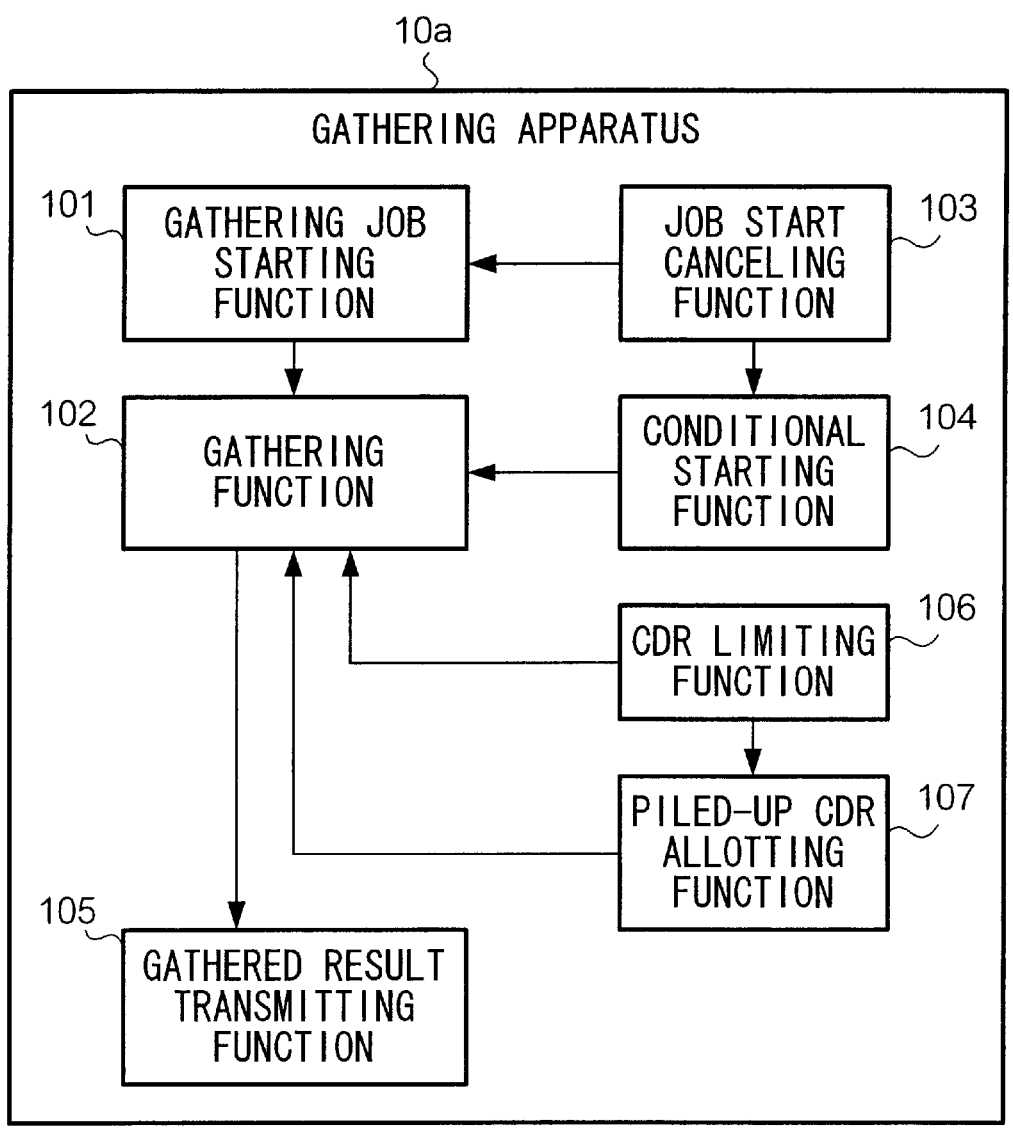
FIG. 8 is a block diagram showing a functional configuration of a gathering apparatus provided in a call detail record manipulating system in accordance with a third embodiment of the present invention.

The functional configuration of a gathering apparatus 10a in the third embodiment is shown in FIG. 8. In this embodiment, the same reference numerals will denote functions similar to the functions of the gathering apparatus 10 in the first embodiment.

The function of the gathering apparatus 10a in the third embodiment differs from the gathering apparatus 10 in the first embodiment in that the gathering apparatus 10a in the third embodiment is equipped with a CDR limiting function 106 for limiting the number of CDRs that can be handled in one cycle operation to a predetermined range, and a piled-up CDRs allotting function 107 that makes it possible to gather CDRs that have been accumulated during a time other than the time corresponding to one cycle operation.

The CDR limiting function 106 has a function for limiting the CDRs in retention, which have occurred in the previous and all preceding cycle operations and have not yet been gathered, to a number of CDRs that can be handled in a preset one-cycle operation.

The piled-up CDRs allotting function 107 has a function for controlling the number of CDRs to a preset number of CDRs and dividing the CDRs that have been excluded by the CDR limiting function 106 to next and all following cycle operations.

With this arrangement, even if, for example, a failure of an exchange system is prolonged and a large number of CDRs piles up during the failure, the manipulating is performed by dividing the CDRs into groups, each of which can be handled in one cycle operation. This makes it possible to successfully cope with an abnormally large number of CDRs generated due to a failure.

[3.2] Operation of the Third Embodiment

Figure 9:
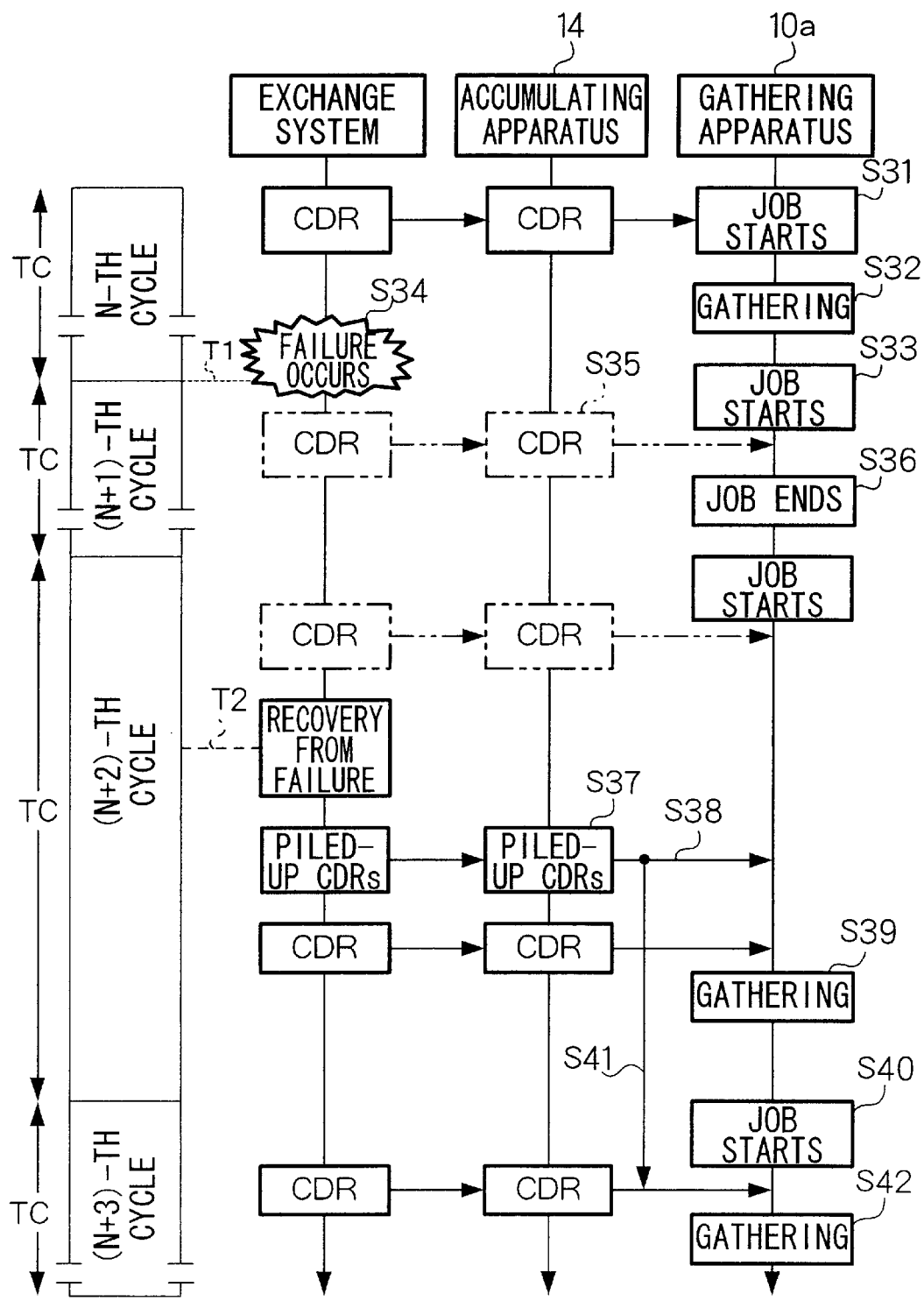
FIG. 9 is a diagram illustrating an operation example of the call detail record manipulating system in the third embodiment.

Referring to FIG. 9, descriptions will be given of an example of operation performed in a call detail record manipulating system 3 if an exchange system fails. In this example of operation, the manipulating time of one cycle of manipulating is set to "TC".

First, at the manipulating start time of the "Nth cycle", which is one cycle of the cycle operation for gathering and processing CDRs, the gathering job for gathering CDRs from the CDR accumulating apparatus 14 is timer-started by the gathering job starting function 101 of the gathering apparatus 10a (step S31).

In the gathering apparatus 10a, a gathering function 102 that functions according to the started gathering job gathers CDRs from the CDR accumulating apparatus 14 according to the gathering in the "Nth cycle" (step S32).

Next, at the manipulating start time of the "Nth cycle", the gathering job for gathering CDRs from the CDR accumulating apparatus 14 is timer-started by the gathering job starting function 101 of the gathering apparatus 10a (step S33).

In this operation example, the exchange system for accumulating generated CDRs in the CDR accumulating apparatus 14 fails at time T1 immediately before the manipulating of an "Nth+1 cycle" is carried out (step S34); therefore, the CDRs corresponding to the gathering in the "Nth+1 cycle" are not accumulated in the CDR accumulating apparatus 14 (step S35). Thus, the gathering job in the "Nth+1 cycle" is terminated without implementing the gathering of CDRs by the gathering function 102 (step S36).

Furthermore, at the manipulating start time of an "Nth+2 cycle", the exchange system has not yet been recovered from the failure; therefore, the state wherein no CDRs are gathered by the gathering function 102 still continues, as in the "Nth+1 cycle". And when the exchange system recovers from the failure at time T2, the exchange system accumulates the CDRs that have been piled up during the failure and that would have been handled in the "Nth+1 cycle" in the CDR accumulating apparatus 14. (Step S37)

A CDR limiting function 106 of the gathering apparatus 10a determines whether or not the number of the piled-up CDRs that were originally planned to be processed in the "Nth+1 cycle" lies within a predetermined range of the number of CDRs that can be handled in an "Nth+2 cycle".

If the determination result indicates that only a portion of the piled-up CDRs can be handled in the "Nth+2 cycle", then a piled-up CDRs allotting function 107 divides the piled-up CDRs into the CDRs to be handled in the "Nth+2 cycle" (step S38) and the CDRs to be handled in an "Nth+3 cycle" and after (step S41). Conversely, if it is determined that all the piled-up CDRs can be handled in the "Nth+2 cycle", then the piled-up CDRs allotting function 107 assigns all the piled-up CDRs as the CDRs to be handled in the "Nth+2 cycle" (step S38).

The gathering function 102 of the gathering apparatus 10*a* gathers the piled-up CDRs of the "Nth+1 cycle" assigned by the piled-up CDRs allotting function 107 as the CDRs to be handled in the "Nth+2 cycle" in addition to the CDRs that have been accumulated in the CDR accumulating apparatus 14 and are to be handled in the "Nth+2 cycle" (step S39).

Next, at the manipulating start time of the "Nth+3 cycle", the gathering job for gathering CDRs from the CDR accumulating apparatus 14 is timer-started by the gathering job starting function 101 of the gathering apparatus 10*a* (step S40).

At this point, the CDR limiting function 106 determines whether or not the number of the piled-up CDRs of the "Nth+1 cycle" that have been assigned by the piled-up CDRs allotting function 107 as the CDRs to be handled in the "Nth+3 cycle" and after lies within a predetermined range of the number of CDRs that can be handled in the "Nth+3 cycle". If the determination result indicates that only a portion of the piled-up CDRs can be handled in the "Nth+3 cycle", then the piled-up CDRs allotting function 107 divides the piled-up CDRs into the CDRs to be handled in the "Nth+3 cycle" and the CDRs to be handled in an "Nth+4 cycle" and after. Conversely, if it is determined that all the piled-up CDRs can be handled in the "Nth+3 cycle", then the piled-up CDRs allotting function 107 assigns all the piled-up CDRs as the CDRs to be handled in the "Nth+3 cycle" (step S41).

The gathering function 102 of the gathering apparatus 10*a* gathers the piled-up CDRs of the "Nth+1 cycle" assigned by the piled-up CDRs allotting function 107 as the CDRs to be handled in the "Nth+3 cycle" in addition to the CDRs that have been accumulated in the CDR accumulating apparatus 14 and are to be handled in the "Nth+3 cycle" (step S42).

[3.3] Advantages of the Third Embodiment

Thus, even if CDRs are piled up due to a failure of an exchange system for accumulating CDRs, the CDR limiting function 106 limits the CDRs to a proper number of CDRs that can be handled in one cycle operation, and the piled-up CDRs allotting function 107 divides the restricted number of CDRs. This makes it possible to handle piled-up CDRs without delay in normal manipulating.

[3.4] Modification of the Third Embodiment

In the third embodiment described above, the gathering apparatus and the processing apparatus are separately provided. Alternatively, however, a terminal apparatus may be used that is equipped with the function provided by the gathering apparatus and the function provided by the processing apparatus.

[4] Fourth Embodiment

[4.1] Configuration of the Fourth Embodiment

[4.1.1] Schematic Configuration of a Call Detail Record Manipulating System

The schematic configuration of the fourth embodiment is similar to the schematic configuration of the first embodiment.

The fourth embodiment differs from the first embodiment in that the fourth embodiment is able to also gather CDRs that have been generated and accumulated while a call detail record manipulating system is out of service, while the first embodiment works on the CDRs that have been generated and accumulated during a time corresponding to one cycle of manipulating.

[4.1.2] Functional Configuration of a Gathering Apparatus

Figure 10:
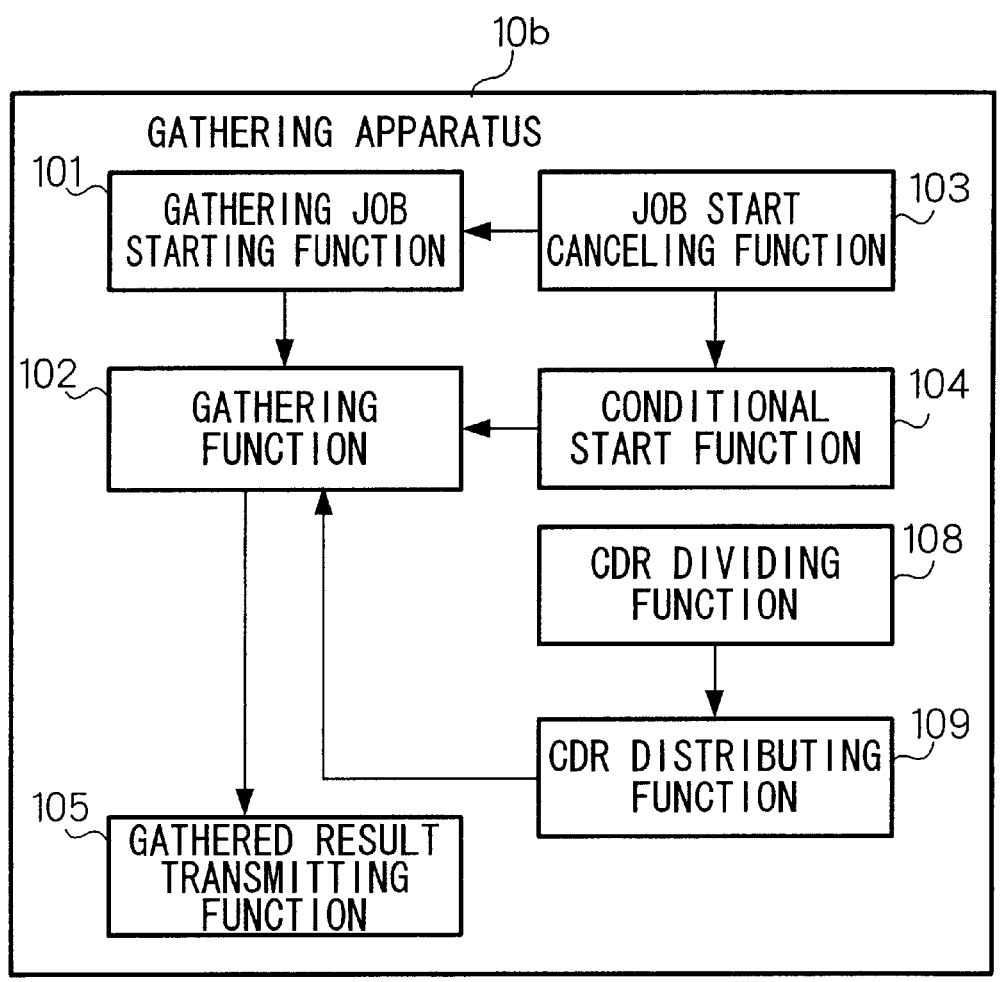
FIG. 10 is a block diagram showing a functional configuration of a gathering apparatus provided in a call detail record manipulating system in accordance with a fourth embodiment of the present invention.

The functional configuration of a gathering apparatus 10*b* in the fourth embodiment is shown in FIG. 10. In this embodiment, the same functions as those of the gathering apparatus 10 of the first embodiment will be assigned the same reference numerals.

The function of the gathering apparatus 10*b* in the fourth embodiment differs from the function of the gathering apparatus 10 in the first embodiment in that the gathering apparatus 10*b* in the fourth embodiment is equipped with a CDR dividing function 108 that divides the number of CDRs accumulated while the call detail record manipulating system was out of service to a predetermined upper limit number of CDRs or less, and a CDR distributing function 109 that distributes CDR groups resulting from the division by the CDR dividing function 108 to individual cycles of manipulating operation after the operation of the call detail record manipulating system is resumed.

With this arrangement, even if a large number of CDRs is accumulated while the call detail record manipulating system is out of service, the accumulated CDRs can be divided into a plurality of CDR groups and distributed, permitting the handling to be performed without influencing the cycles of manipulating operation.

The CDR dividing function 108 has been provided for the following reason: if a large number of CDRs is accumulated while the call detail record manipulating system is out of service, then manipulating all CDRs accumulated while the system was out of service in one cycle of manipulating would require a considerable amount of time. This would influence next and all following cycle operations, causing delay in the operation of the system.

The CDR distributing function 109 is provided for the following reason: since none of the CDRs accumulated while the call detail record manipulating system is out of service are handled, it is necessary to distribute the CDRs, which have occurred while the system was out of service, in addition to the CDRs which have been accumulated during a time corresponding to a cycle of manipulating after the system resumes its operation, to individual cycles of manipulating to process them.

[4.2] Operation of Fourth Embodiment

Figure 11:
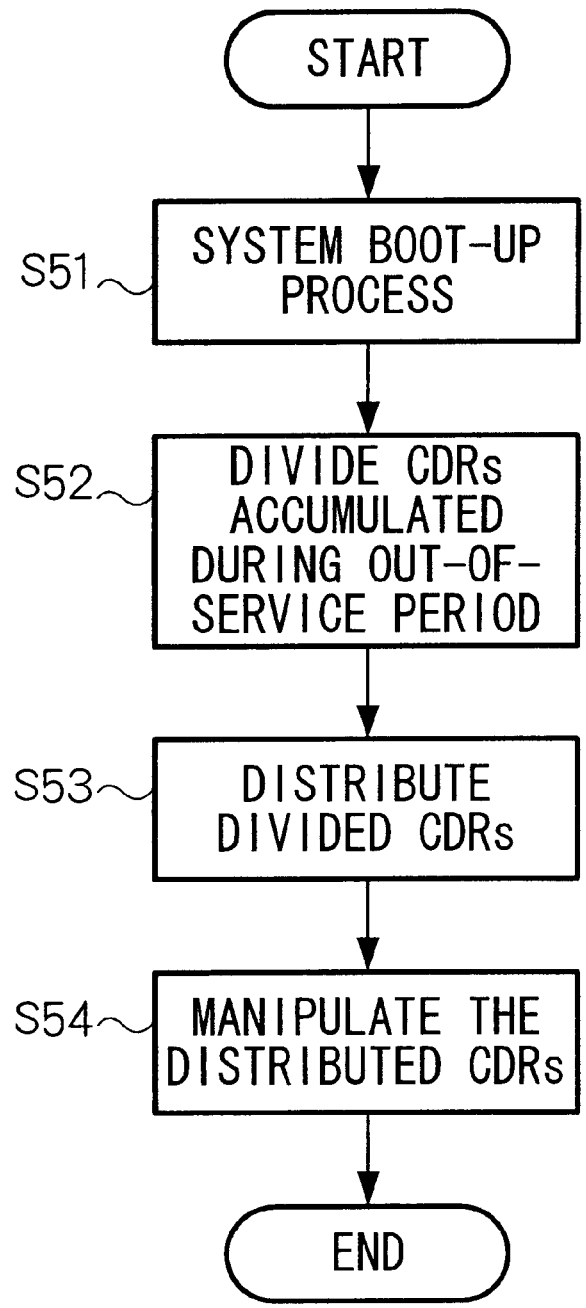
FIG. 11 is a diagram illustrating an operation example of the call detail record manipulating system in accordance with the fourth embodiment.

Referring to FIG. 11, an example of operation for resuming operation in a call detail record manipulating system will be described.

First, in a gathering apparatus 10*b*, the boot-up processing of the call detail record manipulating system is started (step S51).

Then, in the boot-up processing, a CDR dividing function 108 of the gathering apparatus 10*b* divides CDRs, which have been accumulated in a CDR accumulating apparatus 14 while the call detail record manipulating system was out of service, into groups, each of the groups having not more than an upper limit of the number of CDRs allotted to predetermined one cycle operation (step S52).

Then, the CDR distributing function 109 of the gathering apparatus 10*b* distributes the groups of CDRs resulting from the division by the CDR dividing function 108 to individual cycles of processing after the operation is resumed (step S53).

To be more specific, for instance, if there are "2,500" records of CDRs accumulated in the CDR accumulating apparatus 14 while the system was out of service, and the upper limit number of CDRs allotted to present invention one cycle of manipulating operation is "1,500," then the CDR dividing function 108 divides the "2,500" CDRs, which have been accumulated during an out-of-service period, into a CDR group of "1,500" records and a CDR group of "1,000" records. And the CDR distributing function 109 distributes such that the CDR groups resulting from the division are handled in "a first cycle" and "a second cycle".

Then, when a gathering function 102 of a gathering apparatus 10b carries out the gathering in "the first cycle" or "the second cycle", it combines and gathers the CDRs that are to be basically handled in "the first cycle" or "the second cycle" and the group of CDRs that have been distributed to "the first cycle" or "the second cycle" by the CDR distributing function 109 (step S54).

[4.3] Advantage of the Fourth Embodiment

Thus, even if CDRs are accumulated during a period in which the call detail record manipulating system is out of service, the CDR dividing function 108 divides the CDRs accumulated while the call detail record system was out of service into groups, each of the groups having not more than the upper limit number of CDRs allotted to the predetermined one cycle of manipulating, and the CDR groups obtained by the division are distributed by the CDR distributing function 109 before they are gathered. Hence, the CDRs accumulated while the system was out of service can be handled without causing delay in regular manipulating operation.

[4.4] Modification of the Fourth Embodiment

In the fourth embodiment described above, the gathering apparatus and the processing apparatus are separately provided. Alternatively, however, a terminal apparatus may be used that is equipped with the function provided by the gathering apparatus and the function provided by the processing apparatus.

[5] Fifth Embodiment

[5.1] Configuration of the Fifth Embodiment

[5.1.1] Schematic Configuration of a Call Detail Record Manipulating System

Figure 12:
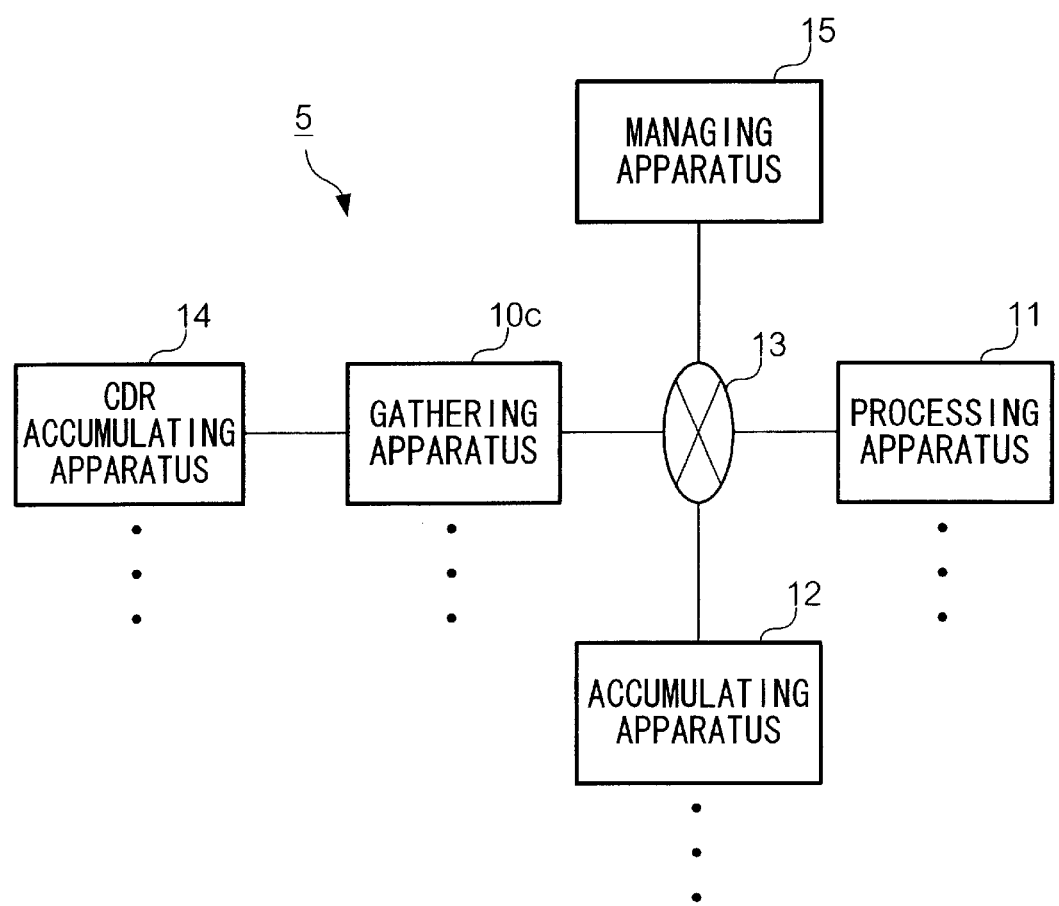
FIG. 12 is a diagram showing a schematic construction of a call detail record manipulating system in accordance with a fifth embodiment of the present invention.

FIG. 12 shows a schematic configuration of a call detail record manipulating system 5 in accordance with the fifth embodiment of the present invention.

As shown in FIG. 12, the call detail record manipulating system 5 is equipped with gathering apparatuses 10c that gather CDRs, which are the records of call details, from a plurality of CDR accumulating apparatuses 14, which are external apparatuses, processing apparatuses 11 that process the CDRs gathered by the plurality of gathering apparatuses 10c, a plurality of accumulating apparatuses 12 that accumulate the CDRs processed by the plurality of processing apparatuses 11, and a managing apparatus 15 that manages the call detail record manipulating system 5.

The gathering apparatuses 10c, the processing apparatuses 11, the accumulating apparatuses 12, and the managing apparatus 15 are connected with each other through the intermediary of a high-speed LAN (Local Area Network), e.g., an FDDI (Fiber Distributed Data Interface).

The hardware configuration of each of the gathering apparatuses 10c, the processing apparatuses 11, the accumulating apparatuses 12, and the managing apparatus 15 is the same as the hardware configuration of the gathering apparatus 10 in the first embodiment.

[5.1.2] Functional Configuration of the Call Detail Record Manipulating System

The functional configurations of the processing apparatuses 11 and the accumulating apparatuses 12 are the same as the functional configurations of the processing apparatus 11 and the accumulating apparatus 12 in the first embodiment.

[5.1.2.1] Functional Configuration of the Gathering Apparatus

Figure 13:
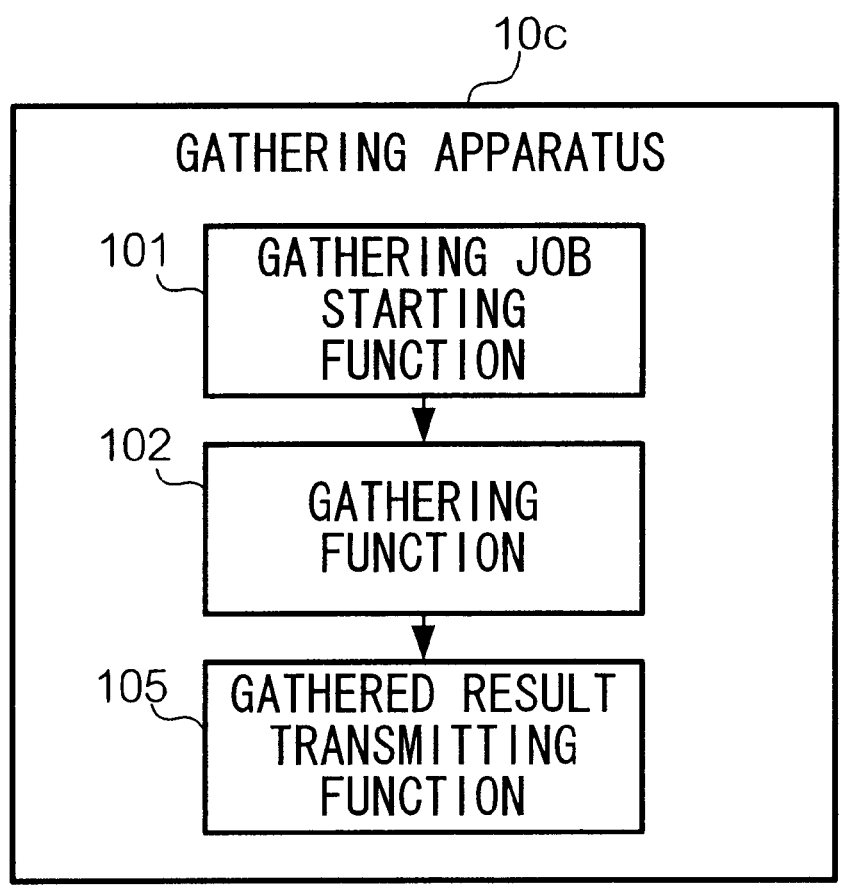
FIG. 13 is a block diagram showing a functional configuration of a gathering apparatus shown in FIG. 12.

Referring to FIG. 13, a functional configuration of the gathering apparatus 10c will be described.

As shown in FIG. 13, the gathering apparatus 10c has a gathering job starting function 101 for starting a gathering job at each start time of a cycle operation for gathering and processing CDRs, a gathering function 110 for gathering CDRs accumulated in the predetermined CDR accumulating apparatus 14, which is an external apparatus, and a gathered result transmitting function 105 for transmitting the gathered CDRs to the processing apparatus 11.

[5.1.2.2] Functional Configuration of the Managing Apparatus

Figure 14:
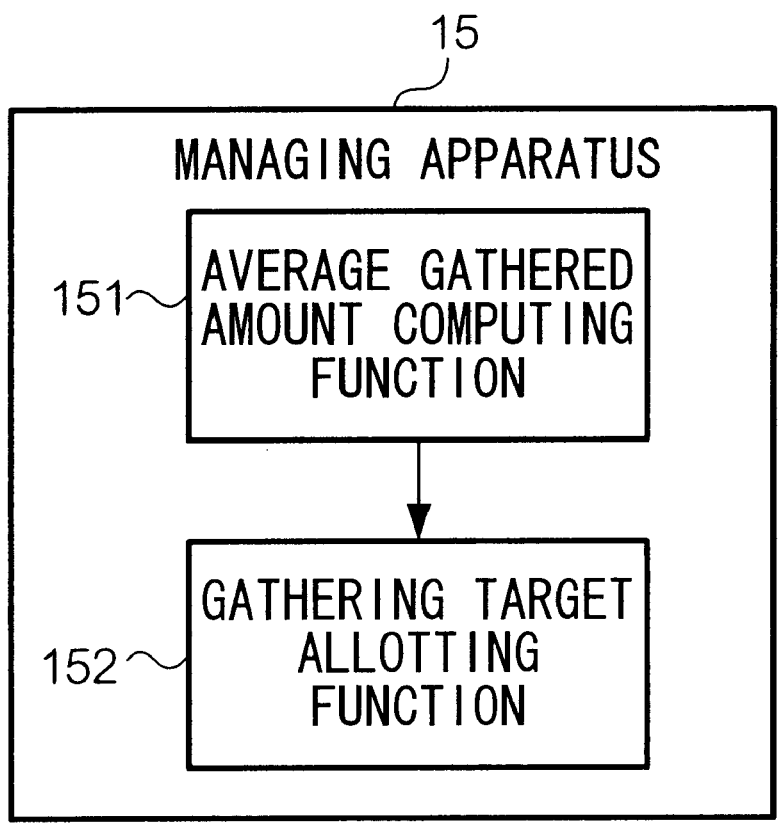
FIG. 14 is a block diagram showing a functional configuration of a managing apparatus shown in FIG. 12.

Referring to FIG. 14, the functional configuration of the managing apparatus 15 will be described.

As shown in FIG. 14, the managing apparatus 15 is equipped with an average gathered amount computing function 151 for computing a gathering amount per the gathering apparatus 10c on the basis of the amount of gathered CDRs collected by the plurality of gathering apparatuses 10c, and a gathering target allotting function 152 for allotting the CDR accumulating apparatuses 14 from which CDRs are gathered such that the gathering amounts of the gathering apparatuses 10c are even on the basis of the average gathered amount of CDR computed by the average gathered amount computing function 151.

In this embodiment, the gathering target allotting function 152 allots the CDR accumulating apparatuses 14 to the gathering apparatuses 10c such that the computed total gathering amounts of the gathering apparatuses 10c combined with the CDR accumulating apparatuses 14 are approximately the same.

[5.2] Operation of the Fifth Embodiment

Figure 15:
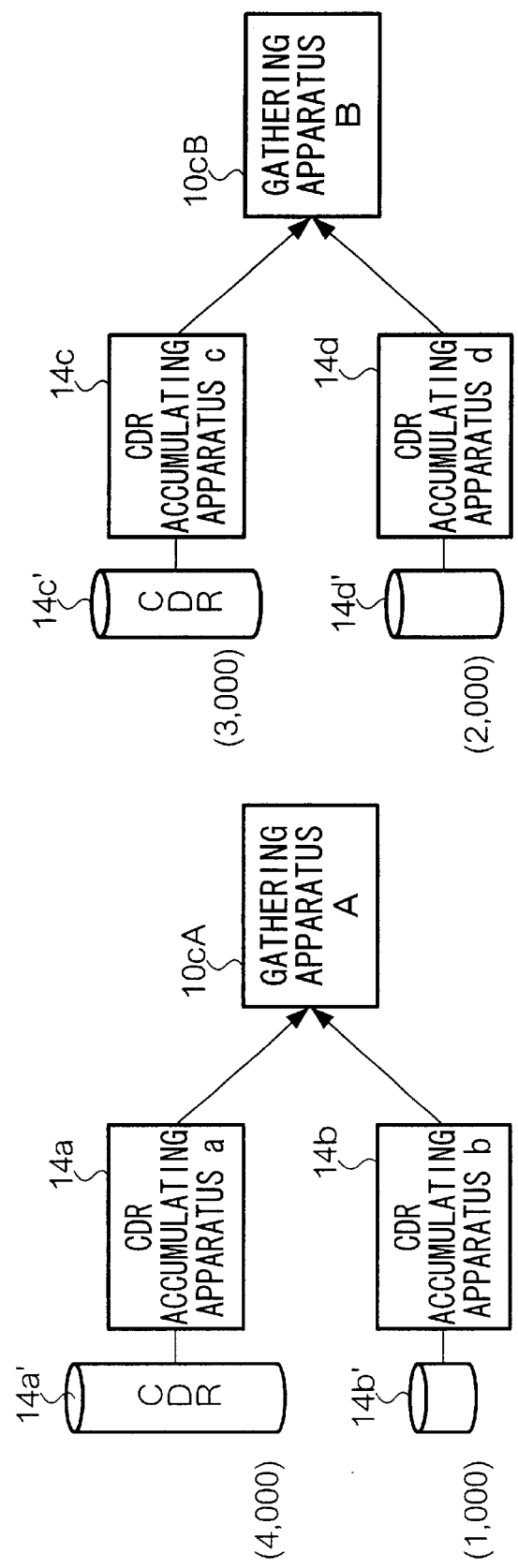
FIG. 15 is a diagram illustrating an operation example of the call detail record manipulating system in accordance with the fifth embodiment.
Figure 16:
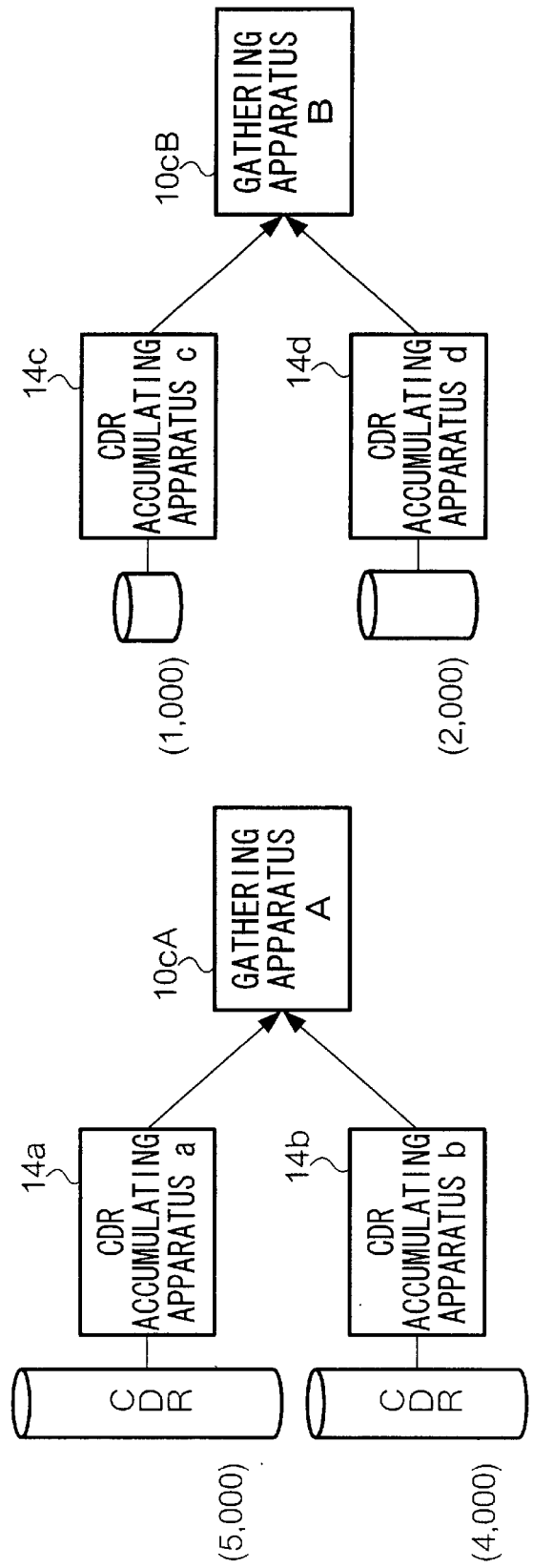
FIG. 16 is a diagram illustrating another operation example of the call detail record manipulating system in accordance with the fifth embodiment.
Figure 17:
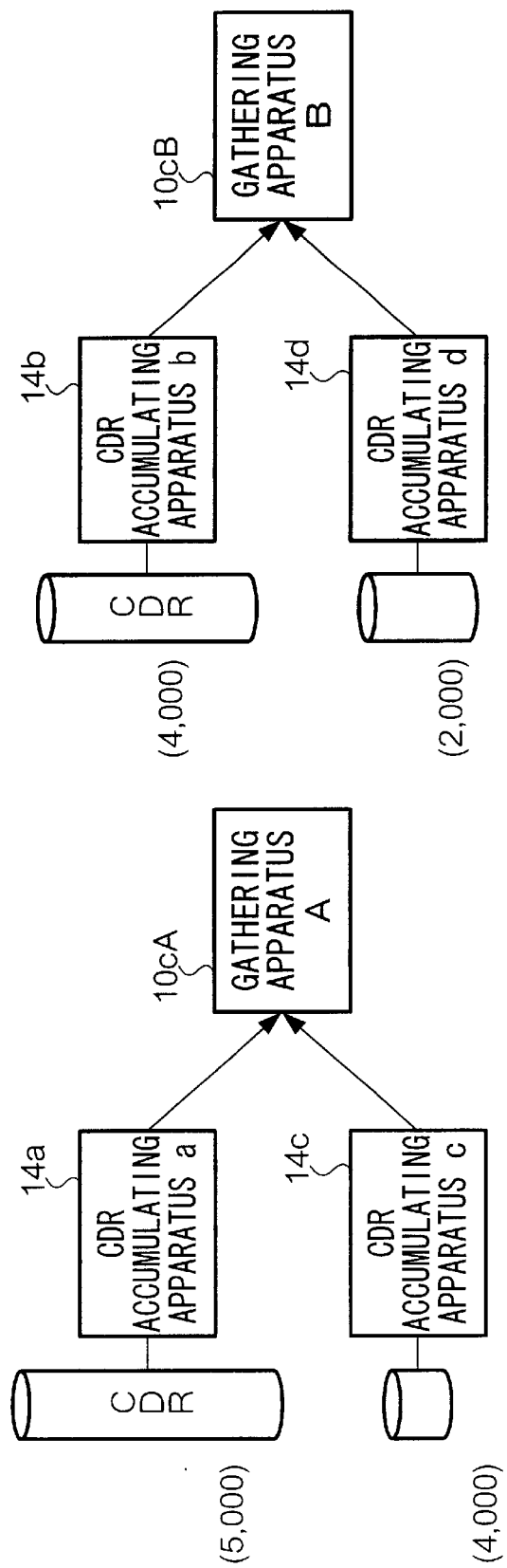
FIG. 17 is a diagram illustrating yet another operation example of the call detail record manipulating system in accordance with the fifth embodiment.

Referring now to FIG. 15 through FIG. 17, the descriptions will be given of an example of operation performed when the accumulating amount of CDRs accumulated in each CDR accumulating apparatus 14 significantly changes in the call detail record manipulating system 5. The heights of columns shown in the drawings denote the sizes of the amounts of CDRs, and the numerals shown in the parentheses indicate specific examples of the amounts of CDRs.

First, FIG. 15 shows a state wherein the conditions of the CDR accumulating apparatuses 14 currently set with respect to the gathering apparatuses 10 in the call detail record manipulating system 5.

As shown in FIG. 15, a gathering apparatus 10cA gathers CDRs from CDR accumulating apparatuses 14a and 14b, and a gathering apparatus 10cB gathers CDRs from CDR accumulating apparatuses 14c and 14d.

As shown in FIG. 15, the total gathering amount of CDRs 14a' and 14b' accumulated at the CDR accumulating apparatuses 14a and 14b is "6,000". Meanwhile, the total gathering amount of CDRs 14c' and 14d' accumulated at the CDR accumulating apparatuses 14c and 14d is "6,000". This means that the average gathered amount of the CDRs gathered by the gathering apparatuses 10cA and 10cB is "6,000". From this, it is understood that the amount of CDRs gathered by the gathering apparatus 10cA and the gathering apparatus 10cB is equal to the average gathered amount, so that the combination was optimal when they were set.

FIG. 16 shows a current state wherein the CDRs accumulated at the CDR accumulating apparatuses have changed.

As shown in FIG. 16, the total gathering amount of the CDRs 14a' and 14b' accumulated at the CDR accumulating apparatuses 14a and 14b is "9,000". Meanwhile, the total gathering amount of the CDRs 14c' and 14d' accumulated at the CDR accumulating apparatuses 14c and 14d is "3,000". Thus, it is understood that far more CDRs are gathered by the gathering apparatus 10cA than the CDRs gathered by the gathering apparatus 10cB.

In this case, the average gathered amount computing function 151 of the managing apparatus 15 computes "12,000" as the total gathering amount of the CDRs gathered by the gathering apparatuses 10cA and 10cB. And the average gathered amount computing function 151 computes "6,000" as the average amount of CDRs per unit gathered by the gathering apparatuses 10cA and 10cB.

Next, the gathering target allotting function 152 of the managing apparatus 15 extracts a combination of CDR accumulating apparatuses that will provide a gathering value nearest to "6,000" that will be the average gathered amount of the gathering apparatuses 10cA and 10cB. In this example of operation, the combination of the CDR accumulating apparatuses 14a and 14c and the combination of the CDR accumulating apparatuses 14b and 14d are extracted.

In this case, the total CDR gathering amount of the CDR accumulating apparatuses 14a and 14c will be "6,000", and the total CDR gathering amount of the CDR accumulating apparatuses 14b and 14d will be "6,000". Thus, since the total CDR gathering amount of each of the combinations is equal to "6,000", which is the average CDR gathering amount, the gathering target allotting function 152 decides that the combinations are optimum combinations, and extracts the combinations.

As a result, as shown in FIG. 17, the gathering target allotting function 152 allots the CDR accumulating apparatuses 14a and 14c as the CDR accumulating apparatuses 14 from which the gathering apparatus 10cA will gather CDRs, and also allots the CDR accumulating apparatuses 14b and 14d as the CDR accumulating apparatuses 14 from which the gathering apparatus 10cB will gather CDRs.

[5.3] Advantage of the Fifth Embodiment

Thus, even if the CDRs accumulated in the CDR accumulating apparatuses 14 vary due to changes in local characteristics, the average gathered amount computing function 151 computes an average gathered amount per unit of the plurality of gathering apparatuses 10c and the gathering target allotting function 152 allots CDR accumulating apparatuses 14 that are optimum for the individual gathering apparatuses 10c, so that it is possible to maintain substantially uniform gathering of the individual gathering apparatuses 10c, thus permitting stable operation to be achieved.

[5.4] Modification of the Fifth Embodiment

In the fifth embodiment described above, the total CDR gathered amounts based on combinations are compared to extract the combinations of the CDR accumulating apparatuses 14 that will provide the total gathered amounts that are closest to an average CDR gathered amount, and the extracted combinations are allotted to the gathering apparatuses 10c. The present invention, however, is not limited to such allotment. Alternatively, the allotment described below may be applied.

First, each of the gathering apparatuses 10c is assigned the CDR accumulating apparatuses 14 in order of decreasing number of CDRs to be gathered, and the allotment for the first apparatus is finished. Then, by reversing the order of the allotment to the first apparatus, each of the gathering apparatuses 10c is assigned the CDR accumulating apparatuses 14 in order of decreasing number of CDRs to be gathered.

Preferably, however, for the allotment in the second apparatus and after, whether the allotment should be carried out or not is determined according to the average gathered amount computed by the average gathered amount computing function 151.

[6] Modification of the Embodiments

In the embodiments described above, the objects to be gathered are the CDRs, which are the records of call details; however, the objects to be gathered may be data in other forms as long as they are the data regarding call charges.

What is claimed is:

1. A call detail gathering apparatus that repeats a gathering cycle operation for gathering call detail records that have occurred in a predetermined occurrence period, comprising:

a gathering unit for gathering call detail records from an external call detail records accumulating apparatus;

a starting unit for starting collection by the gathering unit at each predetermined start time for the gathering cycle operation;

a start canceling unit that cancels starts of a next and all following gathering cycle operations by the starting unit if a gathering cycle operation is not finished within a predetermined gathering cycle operation period; and a conditional starting unit that, if a start has been canceled by the start canceling unit, starts a next and all following gathering cycle operations after the gathering cycle operation is finished.

2. A call detail processing apparatus that repeats a processing cycle operation for processing call detail records that have occurred and have been gathered in a predetermined occurrence period, comprising:

a receiving unit for receiving call detail records from an external call detail records gathering apparatus;

a processing unit for processing the received call detail records; and a process suspending unit that suspends a next and all following processing cycle operations until the processing cycle operation is finished, if a processing cycle operation is not finished within a predetermined processing cycle operation period.

3. A call detail manipulating apparatus that repeats a gathering and processing cycle operation for gathering and processing call detail records that have occurred in a predetermined occurrence period, comprising:

a gathering and processing unit for gathering call detail records from an external call detail records accumulating apparatus and for processing the call detail records;

a starting unit for starting collection by the gathering unit at each predetermined start time for the gathering and processing cycle operation;

a start canceling unit that cancels starts of a next and all following gathering and processing cycle operations by the starting unit if a gathering and processing cycle operation is not finished within a predetermined gathering and processing cycle operation period; and a conditional starting unit that, if a start has been canceled by the start canceling unit, starts a next and all following gathering and processing cycle operations after the gathering and processing cycle operation is finished.

4. A call detail gathering apparatus that repeats a gathering cycle operation for gathering, in a predetermined gathering period that corresponds to the occurrence period, call detail records, that have occurred in a predetermined occurrence period comprising:

a gathering unit for gathering call detail records from an external call detail records accumulating apparatus, wherein the gathering unit gathers ungathered call detail records as well as call detail records that has occurred in the occurrence period, if some call detail records, that has occurred in preceding gathering cycle operations, are still ungathered.

5. The call detail gathering apparatus according to claim 4, wherein the gathering unit comprises a gathering limiter for limiting call detail records to be gathered in one gathering cycle operation, and the gathering unit gathers ungathered call detail records, which have been excluded by the gathering limiter, as well as call detail records to be gathered in a next and all following gathering cycle operations.

6. The call detail gathering apparatus according to claim 5, wherein the gathering limiter gathers the excluded call detail records by limiting them within a range for one gathering cycle operation even in a next and all following gathering cycle operations.

7. The call detail gathering apparatus according to claim 4, comprising a starting unit for starting collection by the gathering unit at each predetermined start time for the gathering cycle operation;

a start canceling unit that cancels starts of a next and all following gathering cycle operations by the starting unit if a gathering cycle operation is not finished within a predetermined gathering cycle operation period; and a conditional starting unit that, if a start has been canceled by the start canceling unit, starts a next and all following gathering cycle operations after the gathering cycle operation is finished.

8. The call detail gathering apparatus according to claim 4, wherein the gathering unit comprises a processing unit for processing the gathered call detail records.

9. A call detail gathering apparatus that repeats a gathering cycle operation for gathering call detail records that have occurred in a predetermined occurrence period, comprising:

a gathering unit for gathering call detail records from an external call detail records accumulating apparatus;

a dividing unit for dividing call detail records that have occurred in an out-of-service period, during which the call detail record gathering apparatus was out of service, into a predetermined number of call detail records; and a distributing unit for distributing call detail records, that have been divided by the dividing unit, to following gathering cycle operations after the call detail record gathering apparatus resumes its operation, wherein the gathering unit gathers the call detail records distributed by the distributing unit as well as call detail records that have occurred in the occurrence period.

10. The call detail gathering apparatus according to claim 9, wherein the predetermined number of call detail records is set within a range in which a gathering cycle operation is finished within a predetermined gathering cycle operation period in the gathering cycle operation.

11. The call detail gathering apparatus according to claim 9, comprising:

a starting unit for starting collection by the gathering unit at each predetermined start time for the gathering operation cycle;

a start canceling unit that cancels starts of a next and all following gathering cycle operations by the starting unit if a gathering cycle operation is not finished within a predetermined gathering cycle operation period; and a conditional starting unit that, if a start has been canceled by the start canceling unit, starts a next and all following gathering cycle operations after the gathering cycle operation is finished.

12. The call detail gathering apparatus according to claim 9, wherein the gathering unit comprises a processing unit for processing gathered call detail records.

13. A call detail managing apparatus that manages a call detail gathering system, wherein the call detail gathering system comprises a plurality of gathering apparatuses for gathering call detail records from a plurality of external call detail records accumulating apparatuses, comprising:

an average gathered amount computing unit for calculating an average gathered amount over a plurality of gathering apparatuses on the basis of gathered amount of the gathering apparatuses; and an assignment setting unit for setting the assignment of the external call detail records accumulating apparatuses to the gathering units on the basis of the average gathered amounts.

14. A call detail manipulating system comprising:

a call detail processing apparatus that repeats a processing cycle operation for processing call detail records that have occurred and have been gathered in a predetermined occurrence period, and includes a receiving unit for receiving call detail records from a call detail records gathering apparatus, a processing unit for processing the received call detail records, and a process suspending unit that, if a processing cycle operation is not finished within a predetermined processing cycle operation period, suspends a next and all following processing cycle operations until the processing cycle operation is finished; and a call detail gathering apparatus that repeats a gathering cycle operation for gathering call detail records that have occurred in a predetermined occurrence period and comprises a gathering unit for gathering call detail records from an external call detail records accumulating apparatus, a starting unit for starting collection by the gathering unit at each predetermined start time for gathering cycle operation, a start canceling unit that cancels starts of a next and all following gathering cycle operations by the starting unit if a gathering cycle operation is not finished within a predetermined gathering cycle operation period, and a conditional starting unit that starts a next and all following gathering cycle operations after the gathering cycle operation is finished if a start has been canceled by the start canceling unit.

15. A call detail manipulating- system comprising:

a call detail processing apparatus that repeats a processing cycle operation for processing call detail records that have occurred and have been gathered in a predetermined occurrence period, and comprises a receiving unit for receiving call detail records from a call detail records gathering apparatus, a processing unit for processing the received call detail records, and a process suspending unit that, if a processing cycle operation is not finished within a predetermined processing cycle operation period, suspends a next and all following processing cycle operations until the processing cycle operation is finished, and a call detail gathering apparatus that repeats a gathering cycle operation for gathering, in a predetermined gathering period that corresponds to the occurrence period, call detail records, that has occurred in a predetermined occurrence period, and comprises a gathering unit for gathering call detail records from an external call detail records accumulating apparatus, a starting unit for starting collection by the gathering unit at each predetermined start time for the gathering cycle operation, a start canceling unit that cancels starts of a next and all following gathering cycle operations by the starting unit if a gathering cycle operation is not finished within a predetermined gathering cycle operation period, and a conditional starting unit that starts a next and all following gathering cycle operations after the gathering cycle operation is finished, if a start has been canceled by the start canceling unit, and a transmitting unit for transmitting the gathered call detail records to the call detail processing apparatus, wherein the gathering unit gathers, if some call detail records that have occurred in preceding gathering cycle operations are still ungathered, the ungathered call detail records as well as call detail records that has been occurred in the occurrence period.

16. A call detail manipulating system comprising:

a call detail processing apparatus that repeats a processing cycle operation for processing call detail records that have occurred and have been gathered in a predetermined occurrence period, and comprises a receiving unit for receiving call detail records from a call detail gathering apparatus, a processing unit for processing the received call detail records, and a process suspending unit that, if a processing cycle operation is not finished within a predetermined processing cycle operation period, suspends a next and all following processing cycle operations until the processing cycle operation is finished, and a call detail gathering apparatus that repeats a gathering cycle operation for gathering call detail records that have occurred in a predetermined occurrence period and comprises a gathering unit for gathering call detail records from an external call detail records accumulating apparatus, a dividing unit for dividing call detail records that have occurred in a suspension period, during which the call detail record gathering apparatus was out of service, into a predetermined number of call detail records, a distributing unit for distributing the call detail records, that have been divided by the dividing unit, to following gathering cycle operations after the call detail record gathering apparatus resumes its operation, a starting unit for starting collection by the gathering unit at each predetermined start time for the gathering cycle operation, a start canceling unit that cancels starts of a next and all following gathering cycle operations by the starting unit if a gathering cycle operation is not finished within a predetermined gathering cycle operation period, a conditional starting unit that starts a next and all following gathering cycle operations after the gathering cycle operation is finished, if a start has been canceled by the start canceling unit, and a transmitting unit for transmitting the gathered call detail records to the call detail processing apparatus, wherein the gathering unit gathers the call detail records, that have been distributed by the distributing unit, as well as call detail records that have occurred in the occurrence period.

17. A call detail gathering method that repeats a gathering cycle operation for gathering call detail records that have occurred in a predetermined occurrence period, comprising:

a gathering step for gathering call detail records from an external call detail records accumulating apparatus;

a starting step for starting collection in the gathering step at each predetermined start time for the gathering cycle operation;

a start canceling step that cancels starts of a next and all following gathering cycle operations in the starting step if a gathering cycle operation is not finished within a predetermined gathering cycle operation period; and a conditional starting step that starts a next and all following gathering cycle operations after the gathering cycle operation is finished, if a start has been canceled in the start canceling step.

18. A call detail processing method that repeats a processing cycle operation for processing call detail records that have occurred and have been gathered in a predetermined occurrence period, comprising:

a receiving step for receiving call detail records from an external call detail records gathering apparatus;

a processing step for processing the received call detail records; and a process suspending step that, if a processing cycle operation is not finished within a predetermined processing cycle operation period, suspends a next and all following processing cycle operations until the processing cycle operation is finished.

19. A call detail manipulating method that repeats a gathering and processing cycle operation for gathering and for processing call detail records that have occurred in a predetermined occurrence period, comprising:

a gathering and processing step for gathering call detail records from an external call detail records accumulating apparatus and for processing the call detail records;

a starting step for starting collection in the gathering step at each predetermined start time for the gathering and processing cycle operation;

a start canceling step for canceling starts of a next and all following gathering and processing cycle operations in the starting step if a gathering and processing cycle operation is not finished within a predetermined gathering and processing cycle operation period; and a conditional starting step that starts a next and all following gathering and processing cycle operations after the gathering and processing cycle operation is finished, if a start has been canceled in the start canceling step.

20. A call detail gathering method that repeats a gathering cycle operation for gathering, in a predetermined gathering period that corresponds to the occurrence period, call detail records, that has occurred in a predetermined occurrence period, comprising:

a gathering step for gathering call detail records from an external call detail records accumulating apparatus, wherein the gathering step gathers the ungathered call detail records as well as call detail records, that have occurred in the occurrence period, if some call detail records that have occurred in preceding gathering cycle operations are still ungathered.

21. The call detail gathering method according to claim 20, wherein the gathering step comprises a gathering limiting step for limiting call detail records to be gathered in one gathering cycle operation, and the gathering limiting step gathers ungathered call detail records, which have been excluded by the gathering limiter, as well as call detail records to be gathered in a next and all following gathering cycle operations.

22. A call detail gathering method that repeats a gathering cycle operation for gathering call detail records that have occurred in a predetermined occurrence period, comprising:

a gathering step for gathering call detail records from an external call detail records gathering apparatus;

a dividing step for dividing call detail records that have occurred in a suspension period, during which the call detail record gathering apparatus was out of service, into a predetermined number of call detail records; and a distributing step for distributing the call detail records that have been divided by the dividing step to following gathering cycle operations after the call detail record gathering apparatus resumes its operation, wherein the gathering step gathers the call detail records distributed by the distributing step as well as call detail records that have occurred in the occurrence period.

23. A call detail management method for managing a call detail gathering system, wherein the call detail gathering system comprises a plurality of gathering apparatuses for gathering call detail records from a plurality of external call detail records accumulating apparatuses, comprising:

an average gathered amount computing step for calculating an average gathered amount over a plurality of gathering apparatuses on the basis of gathering amounts of the gathering apparatuses; and an assignment setting step for setting the assignment of the external call detail records accumulating apparatuses to the gathering apparatuses on the basis of the average gathered amounts.

* * * * *